(12) United States Patent
Gerez

(10) Patent No.: US 11,745,666 B1
(45) Date of Patent: Sep. 5, 2023

(54) WALL REINFORCEMENT AND SHELF SYSTEM FOR A VEHICLE

(71) Applicant: Adrian Steel Company, Adrian, MI (US)

(72) Inventor: Joshua Michael Gerez, Tecumseh, MI (US)

(73) Assignee: Adrian Steel Company, Adrian, MI (US)

(*) Notice: Subject to any disclaimer, the term of this patent is extended or adjusted under 35 U.S.C. 154(b) by 0 days.

(21) Appl. No.: 18/151,491

(22) Filed: Jan. 9, 2023

Related U.S. Application Data

(60) Provisional application No. 63/268,131, filed on Feb. 17, 2022.

(51) Int. Cl.
*B60R 5/00* (2006.01)

(52) U.S. Cl.
CPC .................. *B60R 5/003* (2013.01)

(58) Field of Classification Search
CPC ....... B60R 5/003; A47B 43/00; A47B 43/003; A47B 46/00; A47B 46/005; A47B 47/00; A47B 47/021; A47B 47/022; A47B 47/024; A47B 57/00; A47B 57/045; A47B 96/00; A47B 96/027; A47B 96/06; A47B 96/061
USPC ........................................................ 296/37.1
See application file for complete search history.

(56) References Cited

U.S. PATENT DOCUMENTS

| | | | |
|---|---|---|---|
| 1,611,078 A * | 12/1926 | Robson .................. | B62D 29/02 296/30 |
| 2,605,912 A | 8/1952 | Small et al. | |
| 2,905,424 A * | 9/1959 | Snow ................... | A47B 96/061 248/240.4 |
| 3,602,374 A * | 8/1971 | Alabaster ............. | A47B 57/485 211/193 |
| 3,710,734 A * | 1/1973 | Bofferding ............. | A47B 57/56 248/246 |
| 4,938,403 A | 7/1990 | Cortelli | |
| 6,293,617 B1 | 9/2001 | Sukegawa | |
| 6,487,979 B2 * | 12/2002 | Ash ....................... | B60N 3/002 108/42 |
| 7,152,914 B2 | 12/2006 | Dingman et al. | |
| 7,182,396 B2 | 2/2007 | Taylor | |
| 7,219,952 B2 | 5/2007 | Taylor | |
| 7,338,110 B1 * | 3/2008 | Eckloff ................... | B60R 11/00 296/3 |
| 7,407,216 B2 | 8/2008 | Taylor | |
| 7,661,754 B2 | 2/2010 | Taylor | |
| 8,157,312 B2 | 4/2012 | Bliss, Jr. et al. | |
| 8,262,152 B2 | 9/2012 | Okumura et al. | |
| 8,262,155 B2 | 9/2012 | Leanza | |
| 9,878,649 B2 | 1/2018 | Beere | |
| 10,021,972 B1 * | 7/2018 | Robinson ............... | A47B 57/30 |

(Continued)

FOREIGN PATENT DOCUMENTS

EP        2960112 B1    6/2018

*Primary Examiner* — Hilary L Gutman

(74) *Attorney, Agent, or Firm* — Marshall & Melhorn, LLC

(57) ABSTRACT

A wall reinforcement and shelf system for a vehicle cargo area may have a first rib reinforcing member and a second rib reinforcing member. Both reinforcing members may each have two side walls connected together by a front wall to form a hollow channel. The hollow channel may be shaped and sized to selectively receive a vehicle side wall rib therein. A shelf member may be pivotally connected to each of the first and second rib reinforcing members.

23 Claims, 20 Drawing Sheets

(56) References Cited

U.S. PATENT DOCUMENTS

| | | | |
|---|---|---|---|
| 10,059,376 B2 | 8/2018 | Heitkamp et al. | |
| 10,144,455 B2 | 12/2018 | Anegawa et al. | |
| 10,258,152 B1* | 4/2019 | Lentine | A47B 96/066 |
| 10,368,639 B1* | 8/2019 | Lai | A47B 95/00 |
| 10,470,565 B1* | 11/2019 | Levi | A47F 5/103 |
| 10,479,405 B2 | 11/2019 | Bauer et al. | |
| 10,745,053 B2 | 8/2020 | Terada et al. | |
| 10,779,641 B2 | 9/2020 | Beere | |
| 10,793,199 B2 | 10/2020 | Mika | |
| 11,208,048 B2 | 12/2021 | Herriman et al. | |
| 11,470,961 B2 | 10/2022 | Henry, Jr. et al. | |
| 2005/0167383 A1 | 8/2005 | Taccolini et al. | |
| 2005/0211140 A1* | 9/2005 | McDonald, II | A47B 57/20 |
| | | | 108/108 |
| 2006/0033359 A1* | 2/2006 | Taylor | B60P 3/14 |
| | | | 296/182.1 |
| 2008/0309107 A1 | 12/2008 | Taylor | |
| 2011/0233965 A1 | 9/2011 | Oka | |
| 2013/0278017 A1 | 10/2013 | Arikai et al. | |
| 2017/0217348 A1* | 8/2017 | Paunov | B60R 5/003 |
| 2017/0217358 A1* | 8/2017 | Paunov | B60P 3/007 |
| 2017/0217396 A1 | 8/2017 | Paunov | |
| 2019/0254422 A1* | 8/2019 | Beere | A47B 96/07 |
| 2020/0054125 A1* | 2/2020 | Robinson | A47B 96/028 |
| 2021/0009041 A1* | 1/2021 | Herriman | A47B 57/045 |
| 2021/0112974 A1* | 4/2021 | Appelo | A47B 43/00 |
| 2021/0114498 A1 | 4/2021 | Beere | |
| 2021/0153645 A1 | 5/2021 | Beere | |
| 2022/0097614 A1* | 3/2022 | Henry, Jr. | A47B 96/028 |
| 2022/0388452 A1* | 12/2022 | Henry, Jr. | B60P 3/14 |

\* cited by examiner

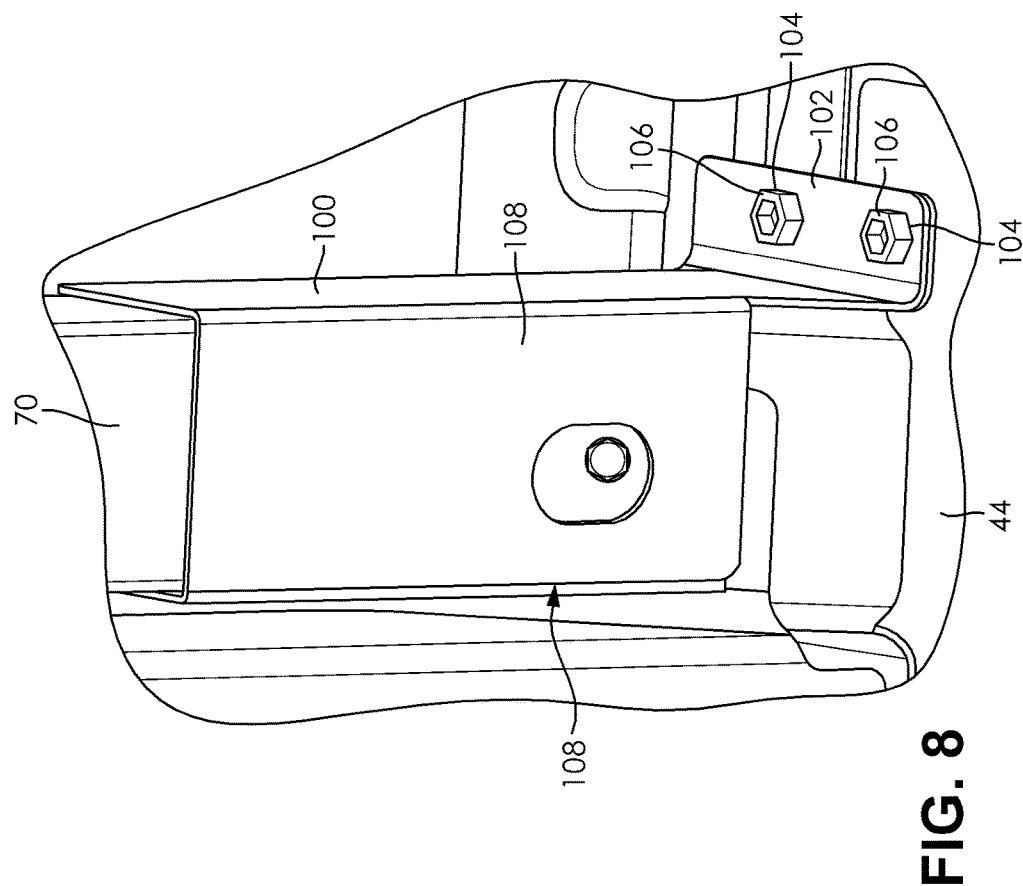
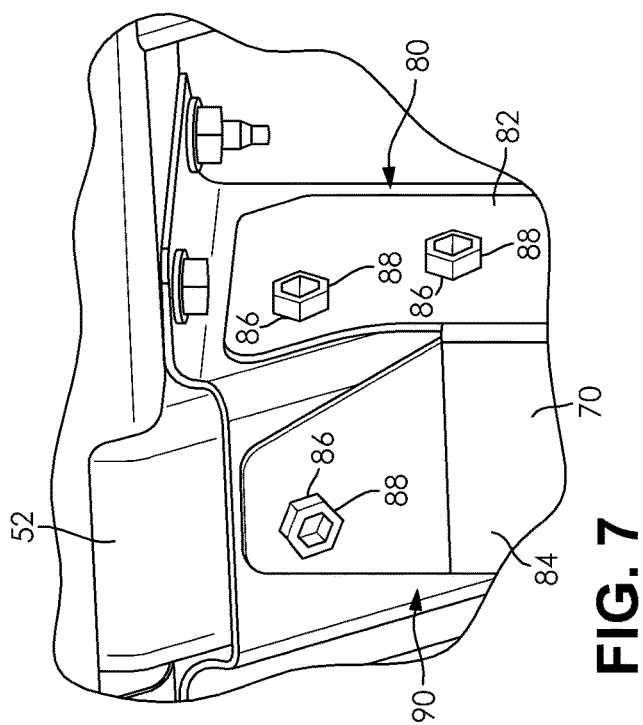

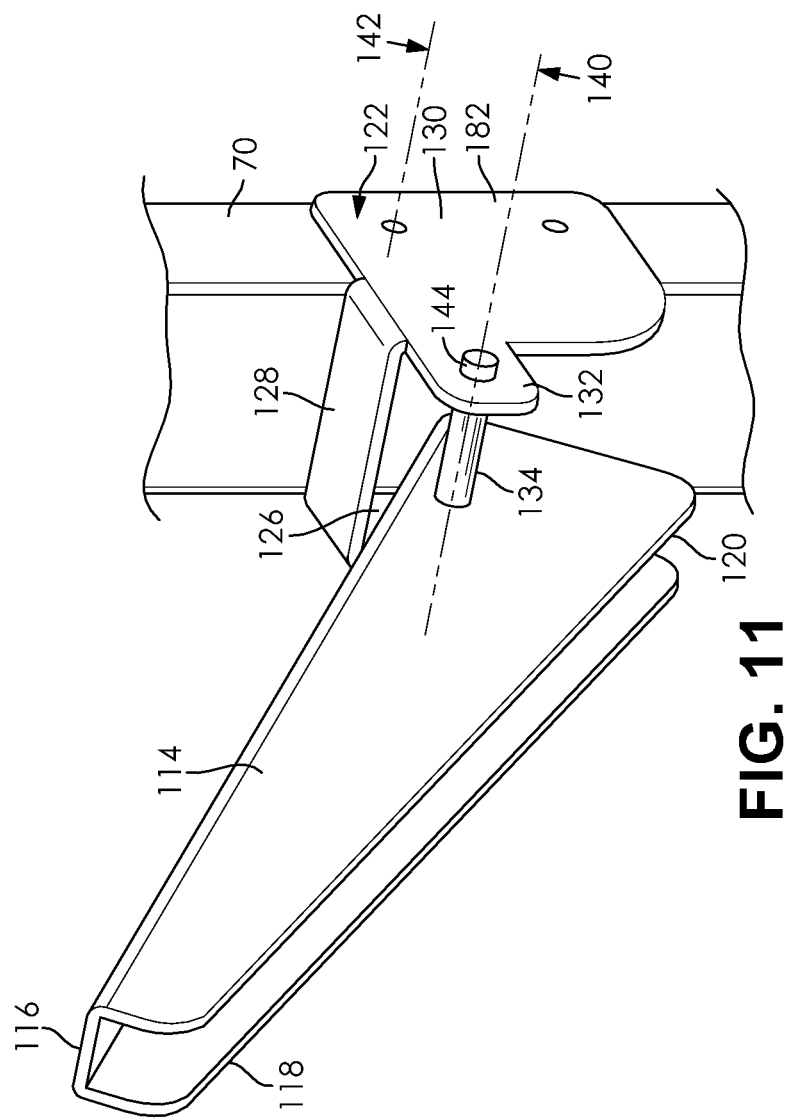

WALL REINFORCEMENT AND SHELF SYSTEM FOR A VEHICLE

FIELD

The present disclosure relates to a wall reinforcement and shelf system for a vehicle, and more particularly, a wall reinforcement and shelf system configured for an interior of a vehicle, such as a utility or cargo type vehicle.

BACKGROUND

Utility and cargo vehicles often have interior spaces that can be fit with a wide variety of structures to store and secure cargo therein, such as a shelf system.

In the past, a shelf system may have been simply attached to the vehicle side wall or its structural members as both were of robust construction capable of supporting a shelf system. However, light-weighting has become particularly important for gas powered, hybrid and electric vehicles and the vehicle side walls and/or structural members have dramatically changed.

For example, the side walls of the cargo portion of a modern utility vehicle (like a box truck) are thin, single walled structures that lack much rigidity and can be flexed merely by pressing on them. The walls are connected by thin vertical and horizontal ribs that are only sufficient to hold the walls in place and they cannot bear much additional weight. Indeed, many of the current ribs have no structures adapted to receive, connect or support equipment, shelving or other related items.

The design of current cargo vehicles leads to further problems for adding shelving. As noted, many of the vehicles are hybrid or full electric vehicles with electronic, wiring and/or batteries. Often these electrical components are located under the vehicle floor. As such, it may be advisable to avoid drilling into the floor or locating fasteners into the floor except where approved by the OEM to prevent damaging the electrical components. Further, if one were to drill into the floor, or a sidewall rib, doing so may weaken them to such an extent that areas of wear and/or damage can be created.

In the situation where a shelf can be added, the prior art systems often have a single fixed position within the vehicle and they cannot be stowed when they are not in use. These prior art shelves take up valuable space when they are not needed.

In other cases, the shelves can be stowed when not in use. These shelves, however, have complicated designs, which causes them to be expensive to manufacture. The manufacturing expense is passed on to consumers which makes the shelves expensive to an end user. The complicated designs also result in additional failure modes.

It would be advantageous for a vehicle shelf system to be simple, yet robust, easily manufacturable and cost effective, and be easily positioned and secured within the vehicle.

SUMMARY

In concordance and agreement with the present disclosure, a vehicle shelf system to be simple, yet robust, easily manufacturable and cost effective, and be easily positioned and secured within the vehicle, has surprisingly been discovered.

In one embodiment, a wall reinforcement and shelf system for a vehicle cargo area may have a vehicle side wall having at least one rib, the rib may have at least one fastener aperture. The system may also have a reinforcing member connected to the at least one rib and extending substantially the length of the rib. The system may also have at least one bracket having a first end portion attached to the reinforcing member and a second end portion extending substantially transverse the reinforcing member wherein the second end portion has a first pivot aperture. The system may also have a shelf support member having an upper portion and a side portion extending substantially transverse the upper portion, wherein the side portion has a second pivot aperture aligned with the first pivot aperture. The system may also have a pivot bar extending through the first and second pivot apertures, wherein the shelf support member selectively pivots about the pivot bar. The system may also have a shelf member attached to the upper portion of the shelf support member. The system may also have a biasing member having a first end connected to the reinforcing member and a second end connected to the side portion of the shelf support member.

In another embodiment, a wall reinforcement and shelf system for a vehicle cargo area may have a vehicle side wall having at least one vertically extending rib. The system may also have a reinforcing member having a header portion and a footer portion, wherein each of the portions have at least one fastener aperture aligned with the fastener apertures in the upper and lower portions of the rib, respectively, wherein the reinforcing member at least partially encases the rib. The system may also have at least one bracket having a first end portion attached to a side wall of the reinforcing member and a second end portion with a first pivot aperture. The system may also have a shelf support member having a second pivot aperture aligned with the first pivot aperture. The system may also have a pivot bar extending through the first and second pivot apertures, the pivot bar extending parallel a front wall of the reinforcing member, wherein the shelf support member selectively pivots about the pivot bar. Further, the system may also have a shelf member attached to the shelf support member.

In another embodiment, a wall reinforcement and shelf system for a vehicle cargo area may have a first rib reinforcing member and a second rib reinforcing member. Both reinforcing members may each have two side walls connected together by a front wall to form a hollow channel. The hollow channel may be shaped and sized to selectively receive a vehicle side wall rib therein. A shelf member may be pivotally connected to each of the first and second rib reinforcing members.

BRIEF DESCRIPTION OF THE FIGURES

FIG. 7 depicts a perspective view of one embodiment of another upper attachment mechanism of the system of FIGS. 2-4;

FIG. 8 depicts a perspective view of one embodiment of another lower attachment mechanism of the system of FIGS. 2-4;

FIG. 11 depicts a perspective view of one embodiment of a support member of the shelving units of the system of FIGS. 2-4;

DETAILED DESCRIPTION

It is to be understood that the device herein may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless expressly stated otherwise.

Figure 1:
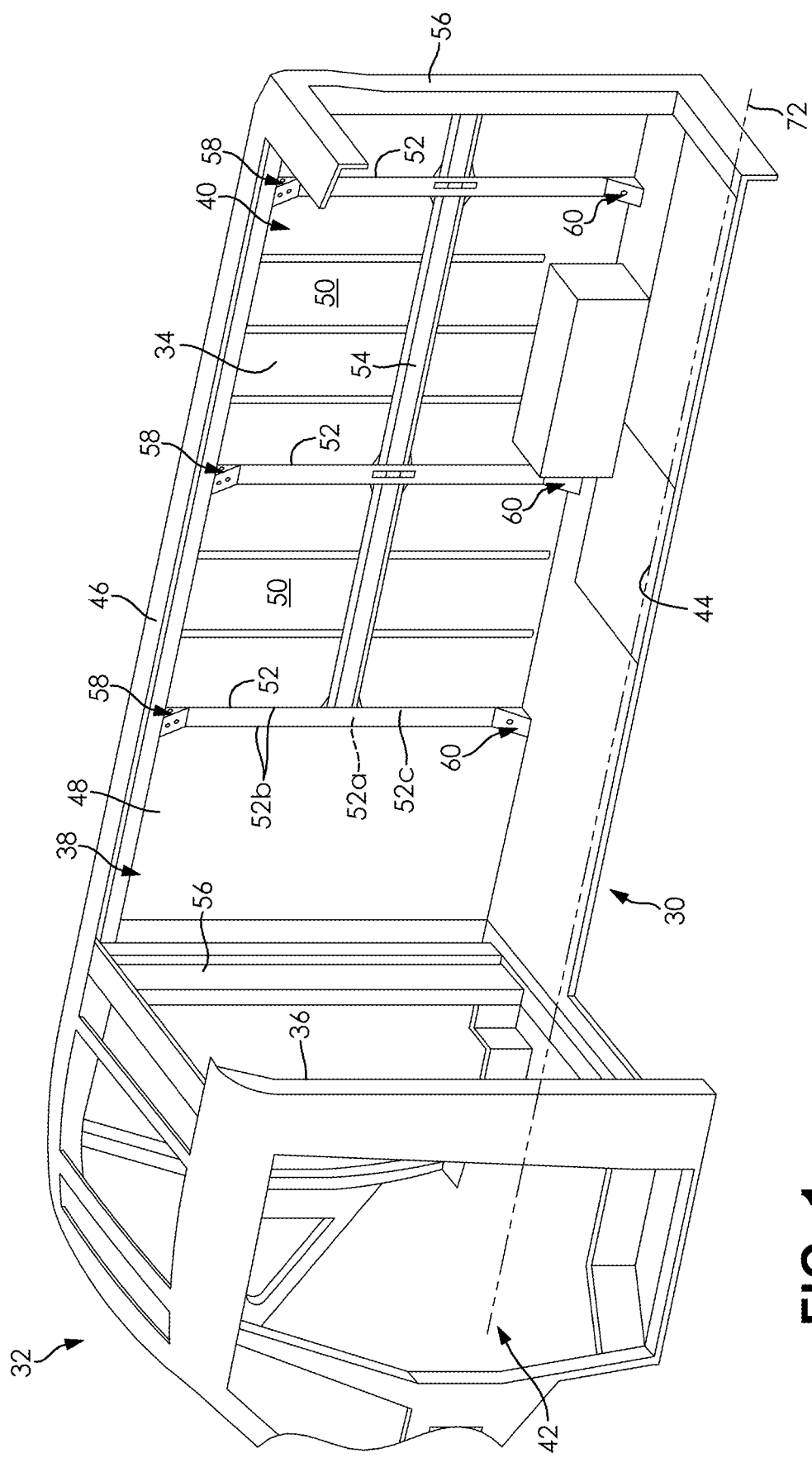
FIG. 1 depicts a side perspective view of a partial cut away showing one embodiment of an interior of a vehicle.
Figure 2:
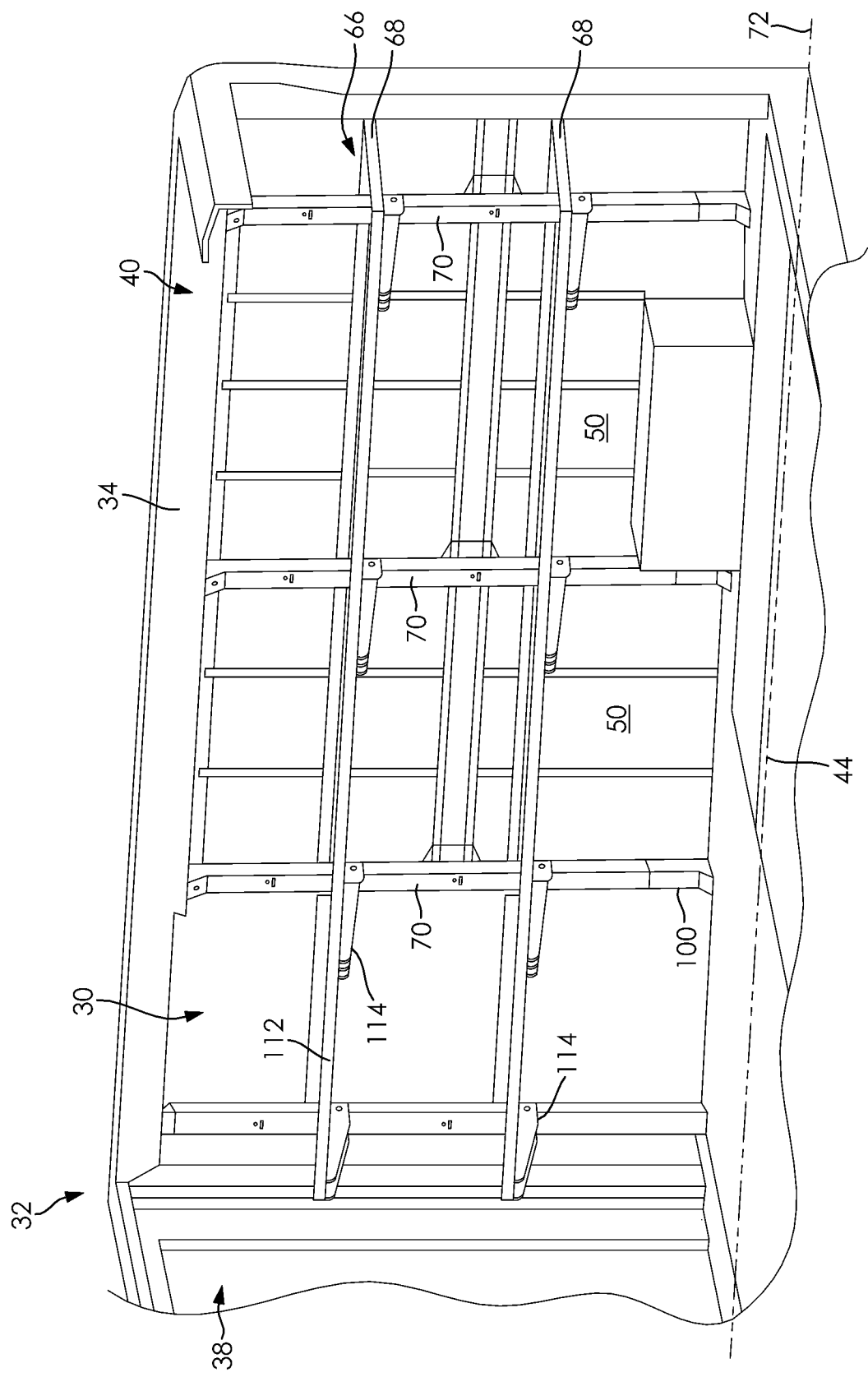
FIG. 2 depicts a side perspective view of a partial cut away showing the interior of the vehicle of FIG. 1 including one embodiment of a wall reinforcement and vehicle shelf system according to an embodiment of the presently disclosed subject matter.

Turning to FIGS. 1 and 2, one embodiment of a partial cargo area 30 for a vehicle 32 is schematically depicted. The vehicle 32 may be such as a cargo van, but other vehicles with other cargo areas of various shapes and sizes may be used.

Figure 12:
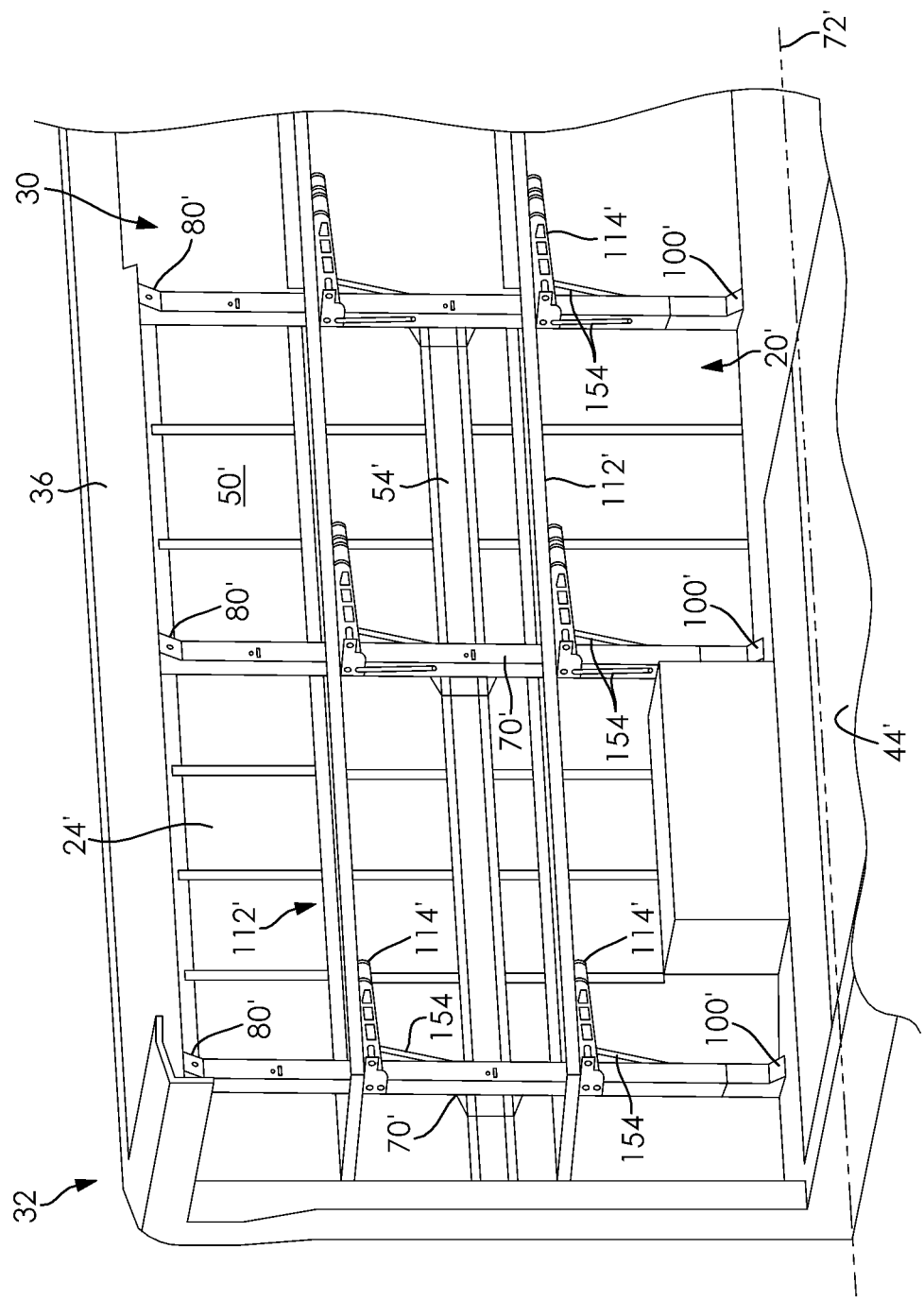
FIG. 12 depicts a side perspective view of a partial cut away showing the interior of the vehicle of FIG. 1 including a system according to another embodiment of the presently disclosed subject matter.
Figure 13:
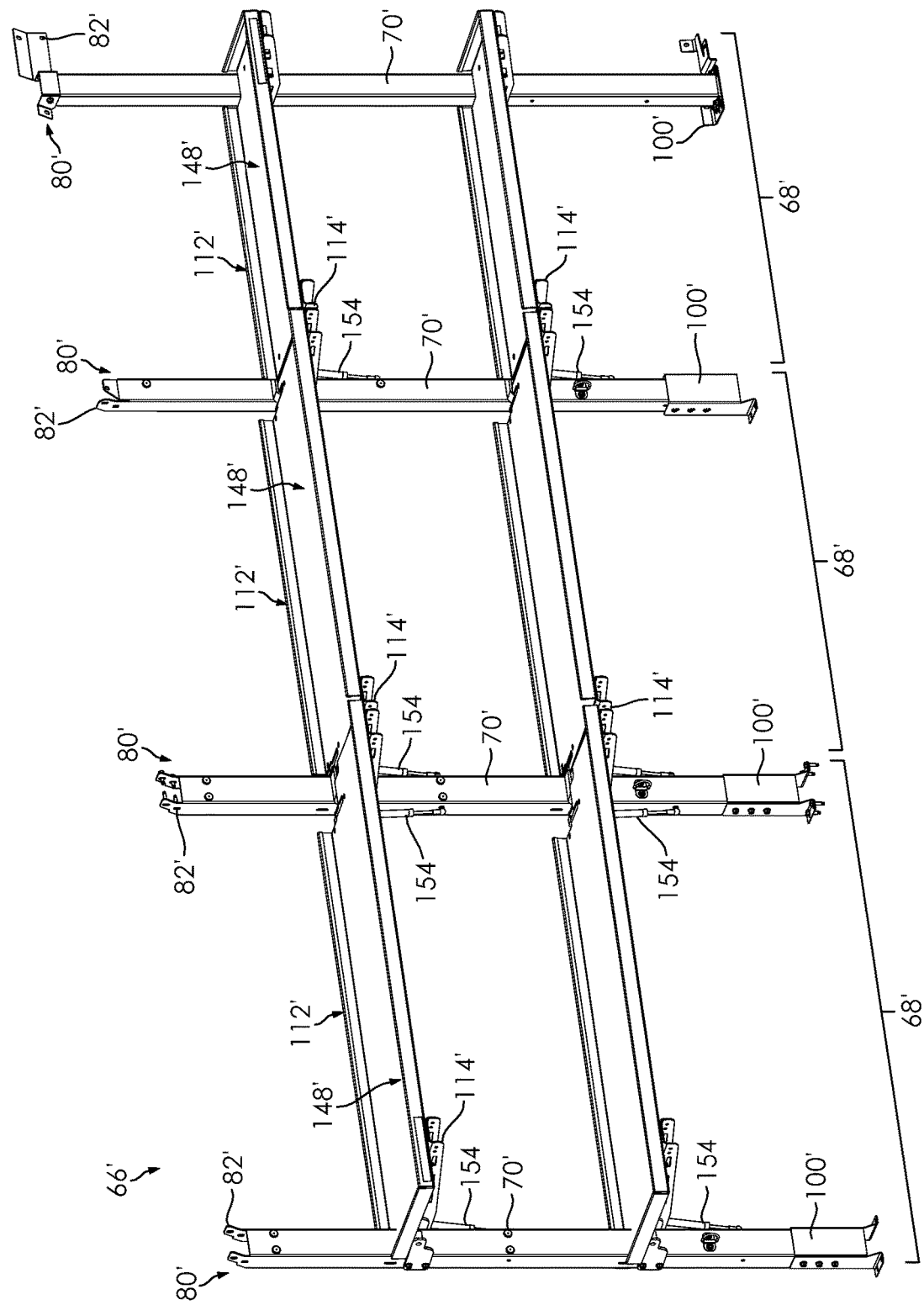
FIG. 13 depicts a front left side perspective view of the system of FIG. 12 including a plurality of shelving units.
Figure 14:
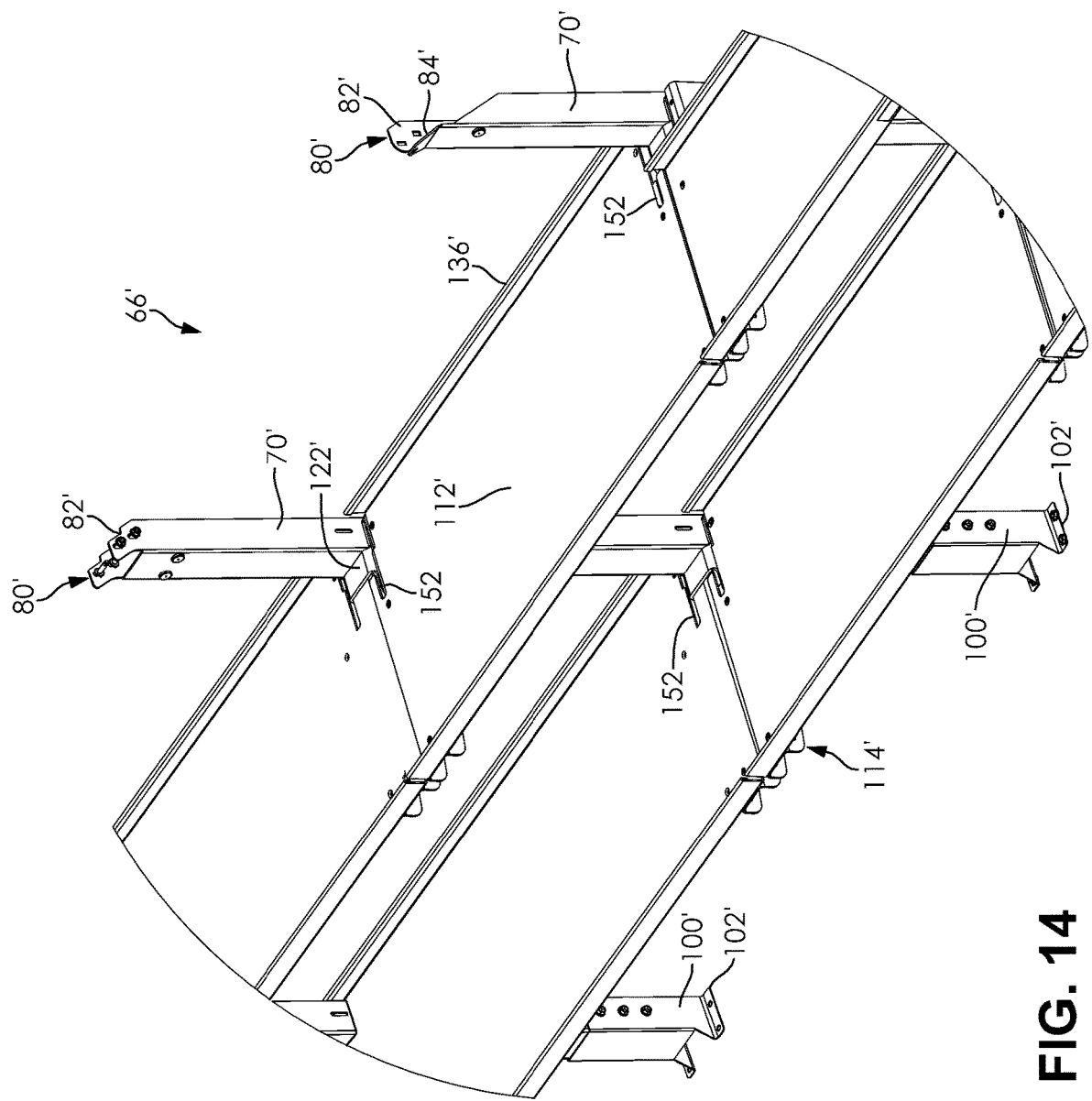
FIG. 14 depicts an enlarged front right side perspective view of a portion of the system of FIGS. 12-13.
Figure 15:
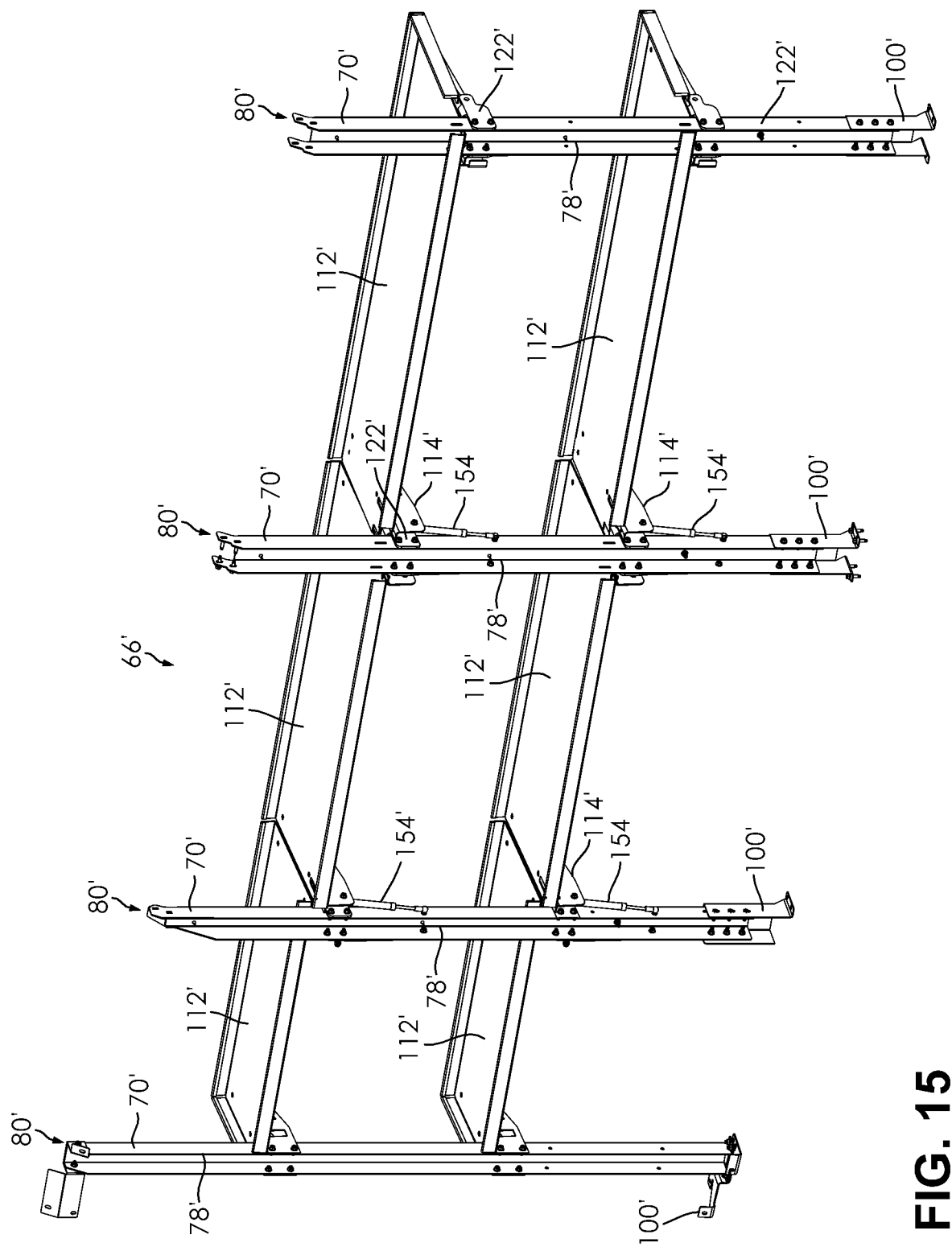
FIG. 15 depicts a rear perspective view of the system of FIGS. 12-14.
Figure 16:
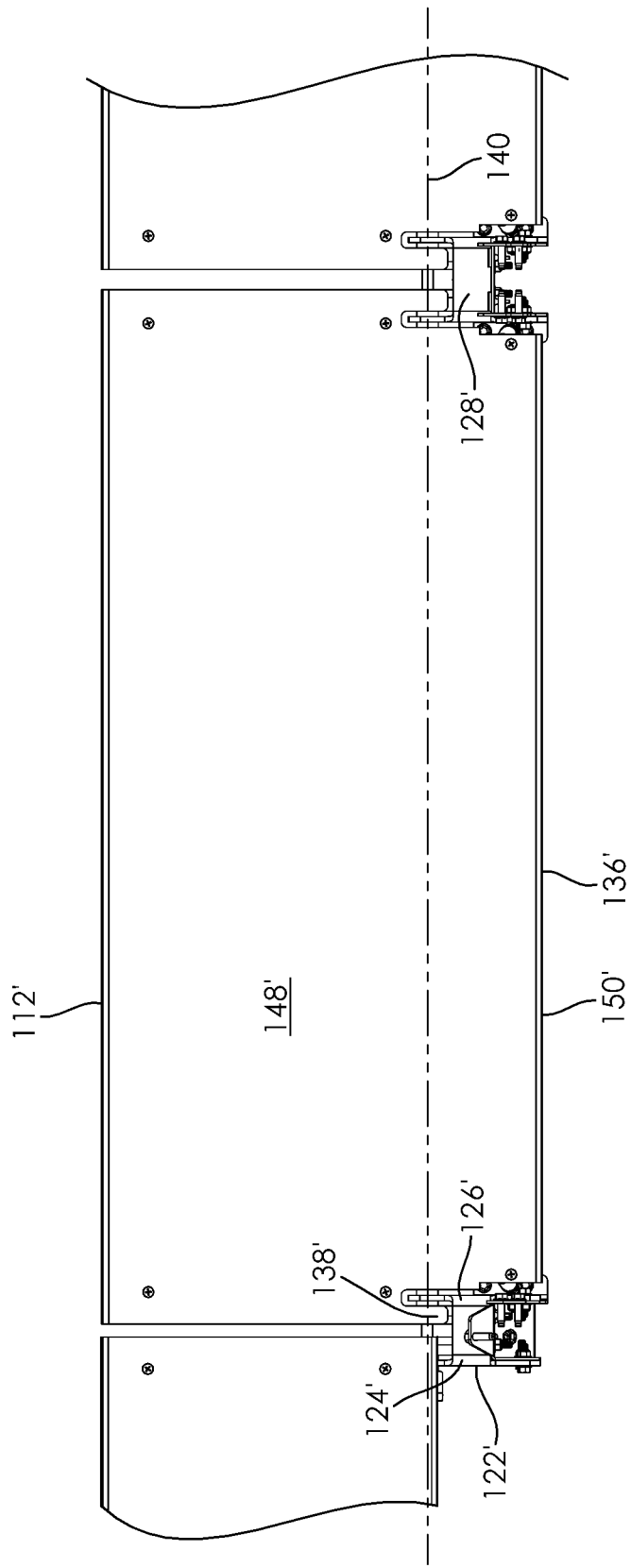
FIG. 16 depicts a top plan view of a portion of the system of FIGS. 12-15.
Figure 17:
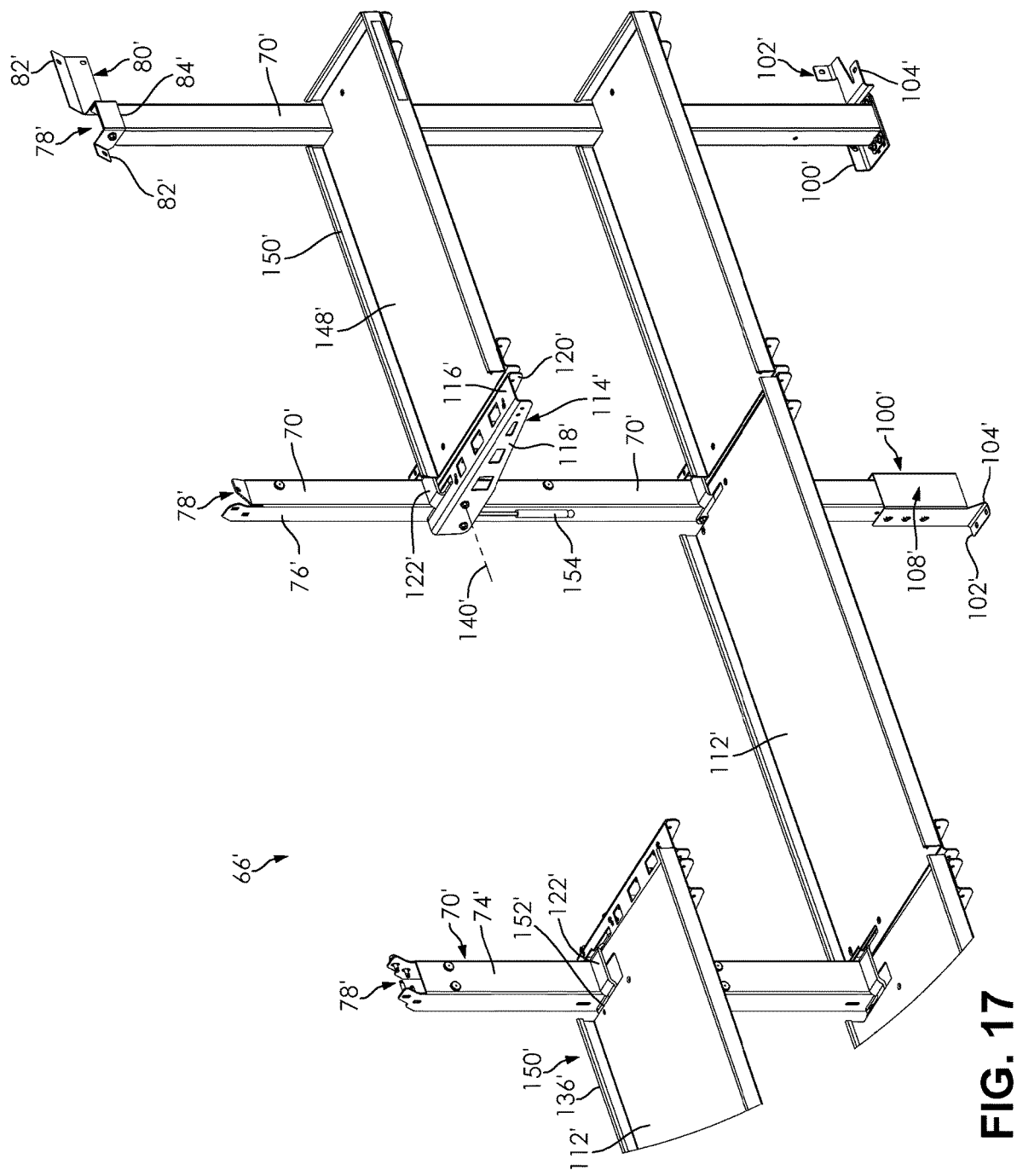
FIG. 17 depicts a front left side perspective view of a portion of the system of FIGS. 12-16, wherein a shelf member of one of the shelving units has been removed.
Figure 18:
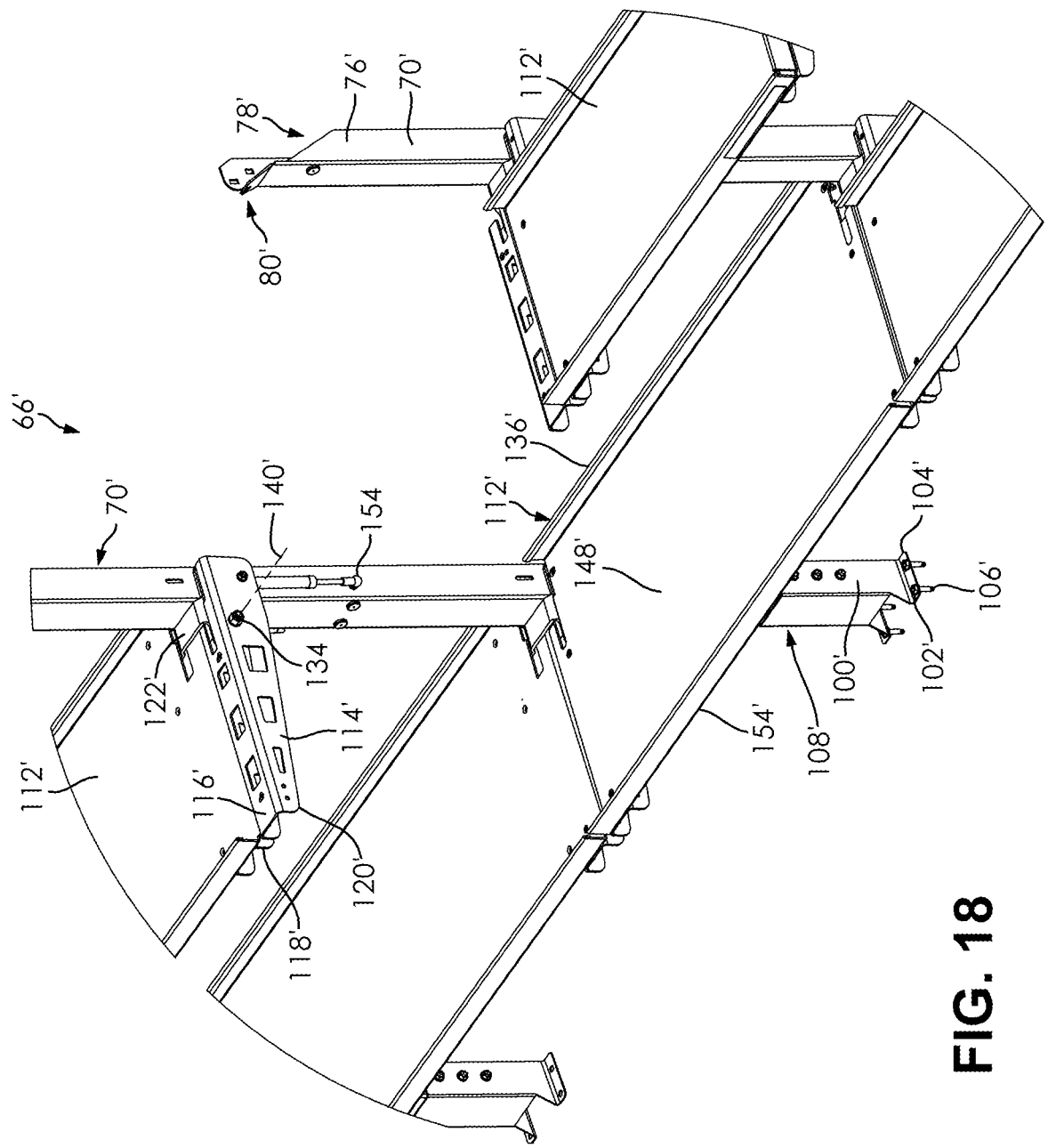
FIG. 18 depicts a front right side perspective view of a portion of the system of FIG. 12-17, wherein the shelf member of one of the shelving units has been removed.
Figure 19:
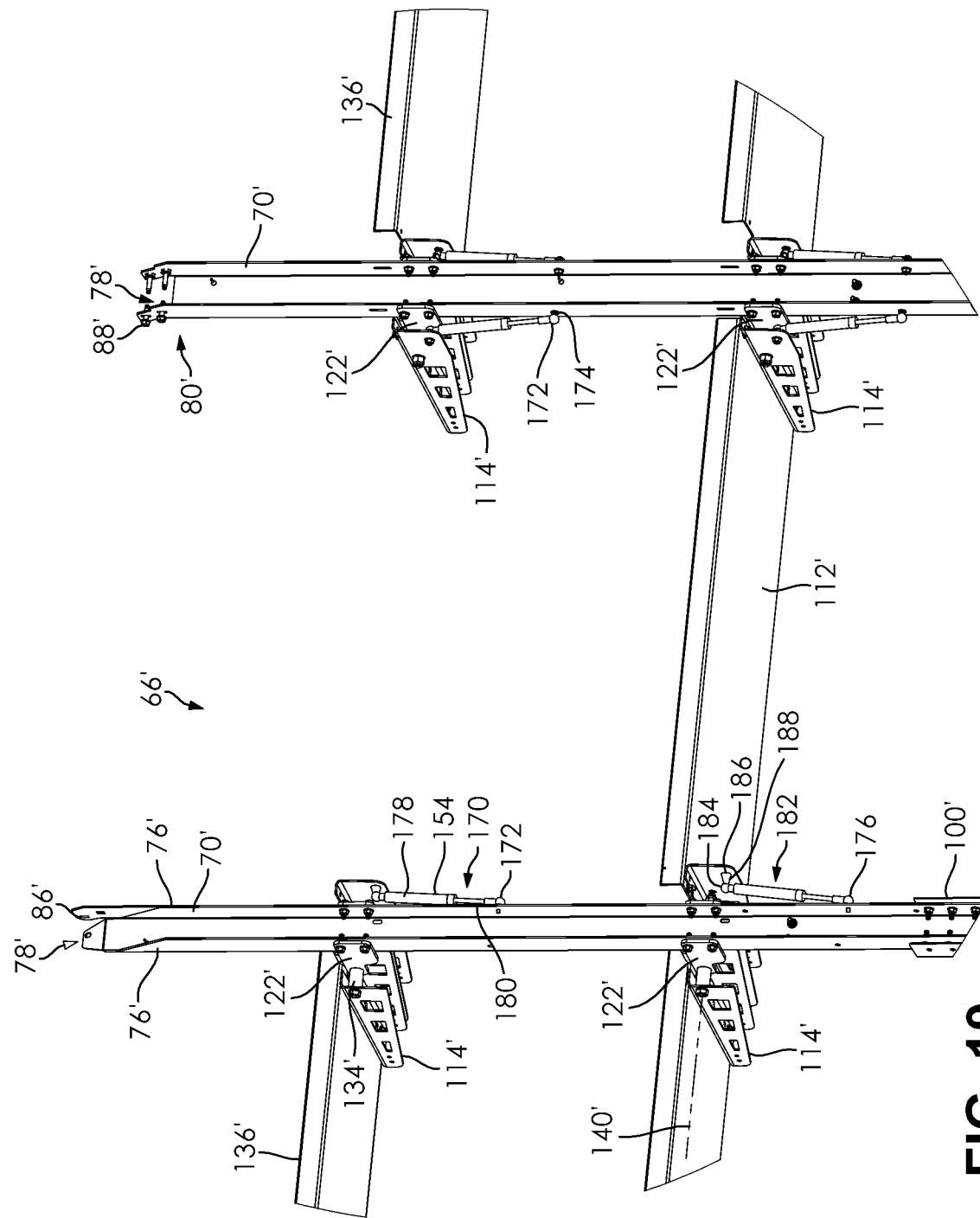
FIG. 19 depicts a rear perspective view of a portion of the system of FIGS. 12-18, wherein the shelf member of one of the shelving units has been removed.
Figure 20:
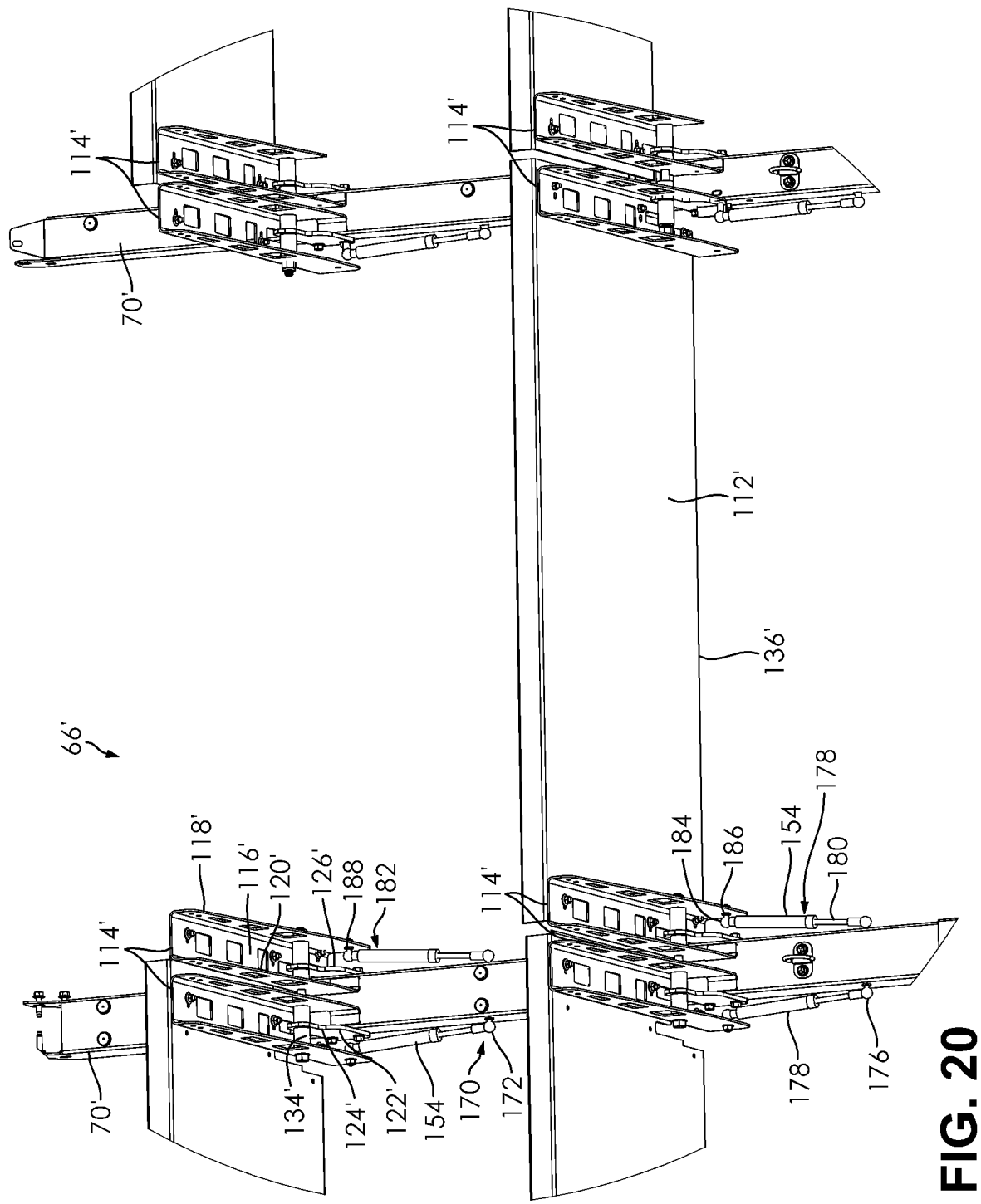
FIG. 20 depicts a bottom perspective view of a portion of the system of FIGS. 12-19, wherein the shelf member of one of the shelving units has been removed.

The cargo area 30 may be defined by at least a sidewall 34, another sidewall 36 (shown in FIG. 12), a forward portion 38 and a rear portion 40. The forward portion 38 may be adjacent an occupant compartment 42. The occupant compartment 42 may be separated from the cargo area 30 by driver and passenger seats (not shown), or a partition (not shown) may separate the cargo area 30 from the occupant compartment 42. The rear portion 40 may terminate with doors or a wall (not shown).

In certain embodiments, the sidewalls 34, 36 are located opposite one another and extend from the forward portion 38 to the rear portion 40 and from a floor 44 to a ceiling 46 of the vehicle 32. The sidewalls 34, 36 may be generally parallel one another, but they may or may not be the same length as one another. Instead, as shown in the depicted embodiment, the sidewall 34 on a passenger side of the vehicle 32 may be shorter than the sidewall 36 on the driver side of the vehicle 22 to accommodate a sliding or hinged door(s) 48.

In some cases, each of the sidewalls 34, 36 may be comprised of a plurality of panels 50, ribs 52, and/or rails 54. The ribs 52 and/or rails 54 function as a skeleton to which the panels may be connected to, and/or extend between. The panels 50, ribs 52 and/or rails 54 may be located between pillars 56 of the vehicle 32. The pillars 56 are structural members and may be part of the frame work of the vehicle. Pillars 56 are usually larger and more robust that the ribs 52 and/or the rails 54 and there are fewer pillars 56 compared with the ribs 52 and/or rails 54. Pillars 56 may be located at the corners of the cargo area 30.

Figure 5:
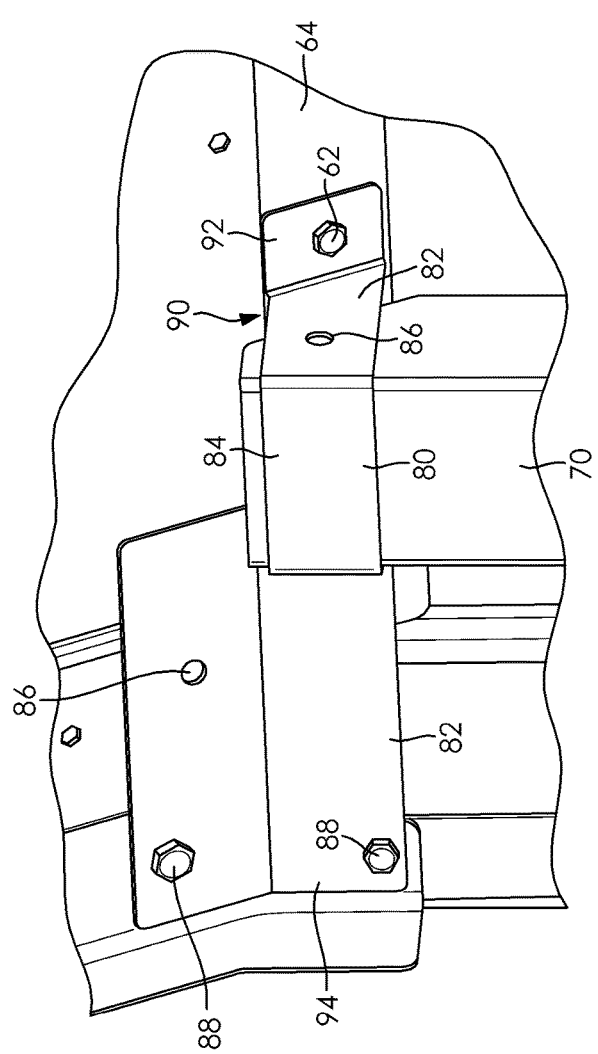
FIG. 5 depicts a perspective view of one embodiment of an upper attachment mechanism of the system of FIGS. 2-4.

As illustrated in FIG. 1, at least one of the ribs 52 may include an upper portion 58 connecting the at least one of the ribs 52 to the ceiling 46 (or a member associated with the ceiling 46) and a lower portion 60 connecting the at least one of the ribs 52 to the floor 44 (or a member associated with the floor 44). As depicted in FIG. 5, the upper portion 58 may be coupled to the ceiling 46 by extending a fastener 62 into a ceiling rail 64. The lower portion 60 may also be coupled to the floor 44 by a mechanical fastener if desired. The ribs 52 may also be connected to the ceiling 46 or floor 44 such as through welding.

The ribs 52 may have four walls such as a back wall 52a, two side walls 52b and a front wall 52c, the back wall 52a may be a rear surface of the front wall 52c. The back wall 52c may be directly attached to the panel 50. The two side walls 52b may be directly connected to the back wall 52a. The front wall 52c may extend between the two side walls 52b. In some cases where the rib 52 is a strip of material, the front wall 52c may be the front surface of the back wall 52a. The ribs 52 may be connected to the panels 50 via mechanical fasteners, such as rivets or the like and/or adhesives and/or the ribs 52 may be integrally formed with the panels 50. One or more of the ribs 52 may extend substantially continuously from the floor 44 to the ceiling 46.

In some cases, the panels 50, ribs 52, rails 54 and/or pillars 56 are original equipment provided by the original equipment manufacturer. These structures are sufficient to enclose the cargo portion 30, but particularly the panels 50, ribs 52 and/or rails 54 are not capable for supporting significant additional weight or structures thereon. This may be a byproduct of vehicle light-weighting initiatives by original equipment manufacturers. This might be done to make the vehicle less expensive, smaller, lighter and/or more energy efficient.

However, some vehicle end users require shelving and the like in the vehicle to store and secure items and to make the vehicle more functional for their applications and uses.

Figure 3:
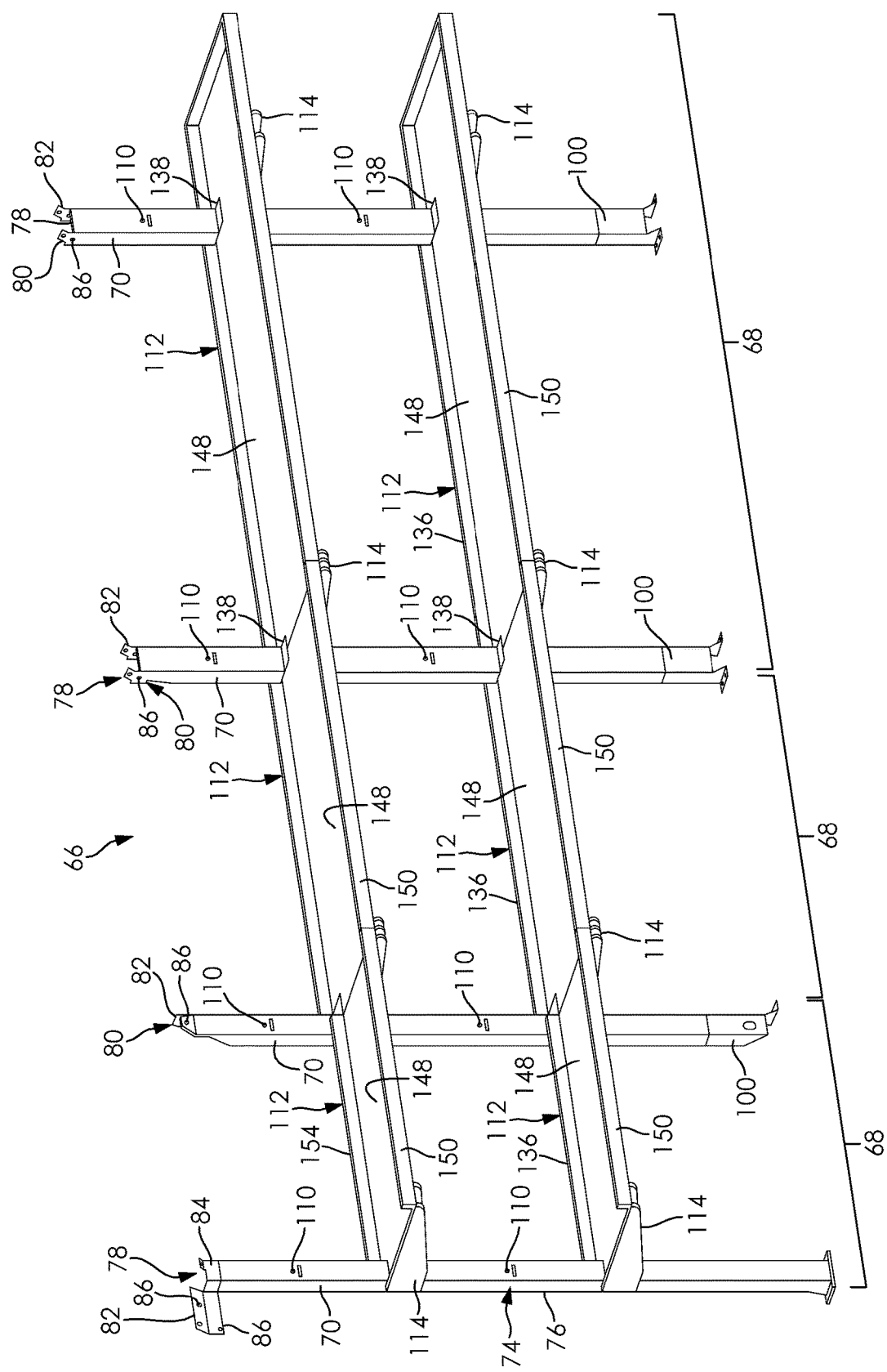
FIG. 3 depicts a perspective view of the system of FIG. 2 including a plurality of shelving units.
Figure 4:
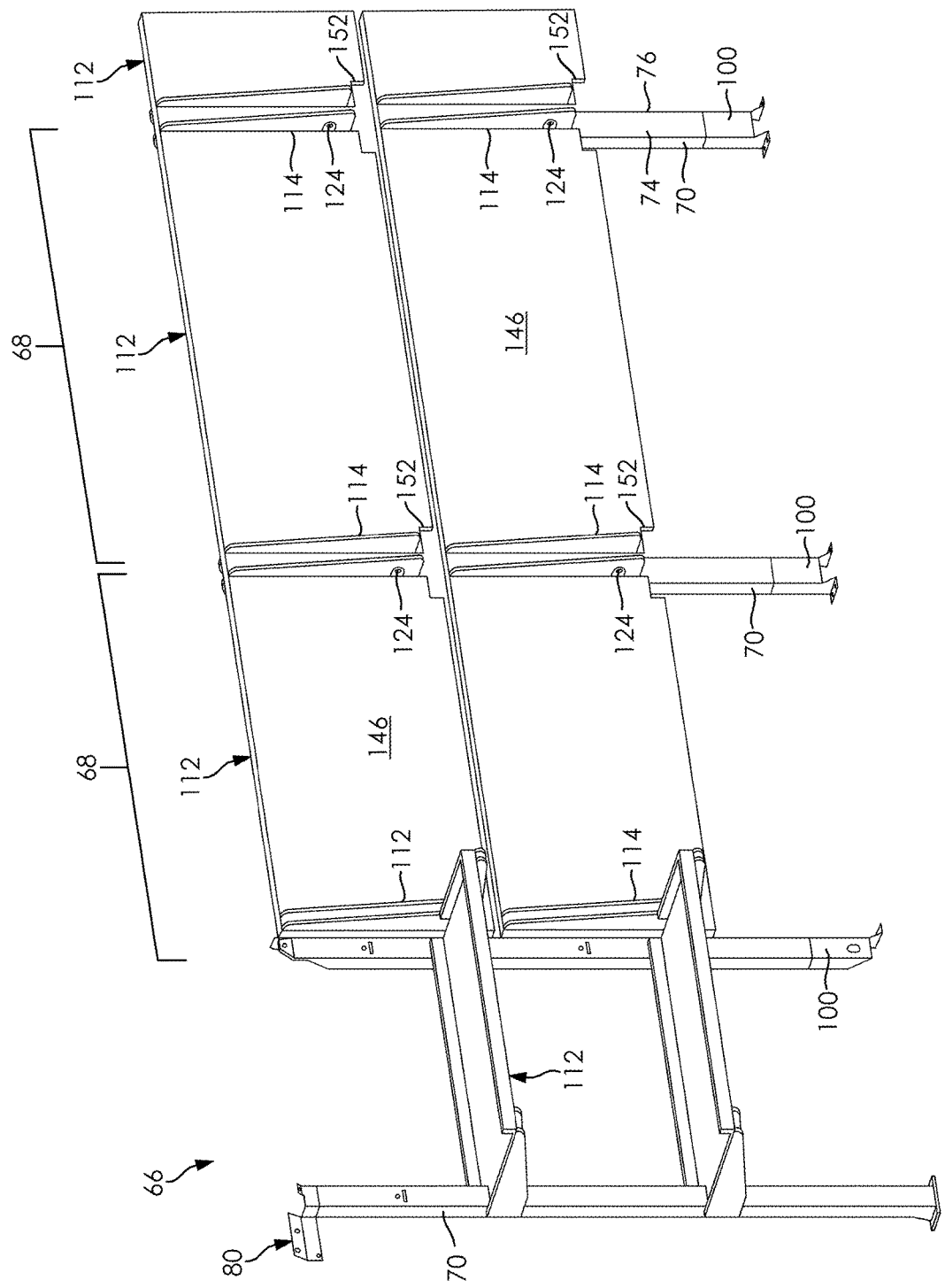
FIG. 4 depicts a perspective view of the system of FIGS. 2 and 3, showing one of the shelving units having a pair of shelf members in an in-use, first position and a remainder of the shelving units having a plurality of shelf members in a raised or stowed, second position.

A vehicle shelf system 66 described and depicted herein is designed to work with the existing panels 50, ribs 52, and/or rails 54 without any modification to their size, shape, location or structural integrity certain portions of the system 66 may function to reinforce the panels 50, ribs 52 and/or rails 54. The vehicle shelf system 66 may be comprised of a plurality of components. FIGS. 3 and 4 depict one embodiment of the vehicle shelf system 66, while FIG. 2 depicts the vehicle shelf system 66 installed in the exemplary vehicle 32.

The vehicle shelf system 66 shown in FIGS. 3 and 4 may include one or more shelving units 68. Each of the shelving units 68 may have one or more upright members 70. In certain embodiments, each of the shelving units 68 may comprise a pair of spaced apart upright members 70. The upright members 70 may be spaced apart from one another along a longitudinal axis 72 of the vehicle 32.

One of the shelving units 68 may share at least one of its upright members 70 with another adjacent one of the shelving units 68. The upright members 70 may be the same as one another, or they may be different.

The upright member 70 may be a single piece of stamped metal, but it may also be comprised of multiple pieces that are connected together such as through welding and/or mechanical fasteners.

In some cases, the upright member 70 may have a generally U-shaped cross-section. As a non-limiting example, the upright member 70 may have a central portion 74 bounded by two side portions 76. The side portions 76 may be the same as one another or different. The central portion 74 and the side portions 76 may extend the length of the upright member 70. The side portions 76 may be parallel with one another but not coplanar with one another; the central portion 74 may extend generally transverse the side portions 76. In some embodiments, the individual side portions 76 may have a width (extending transverse the longitudinal axis) that is generally equal the width (extending parallel the longitudinal axis) of the central portion 74.

The side portions 76 and the central portion 74, regardless of their width with respect to one another, may generally define the U-shaped cross section and a void space 78 in the middle of the U. The side portions 76 and the central portion 75 and thus the void space 78 may be sized to receive a rib 52 at least partially therein.

In one embodiment, the upright member 70 may be sized and shaped to extend substantially along the length of a rib 52. It may also be that the upright member 70 may be located substantially over the rib 52 to substantially enclose or encase the rib 52. In some cases, the upright member 70 may not enclose or encase all of the upper and/or lower portion 58, 60 of the rib.

The central portion 74 of the upright member 70 may extend substantially parallel and continuously along the rib front wall 52c. The upright member 70 side portions 76 may extend substantially parallel and continuously along the rib side walls 52b. As such, the upright member 70 central portion 74 and side portions 76 may substantially encase the rib front wall 52c and rib side walls 52b.

As best seen in FIGS. 3 and 4, at least one of the upright members 70 may include an upper attachment mechanism 80. There may be a number of embodiments of the upper attachment mechanism 80.

Figure 9:
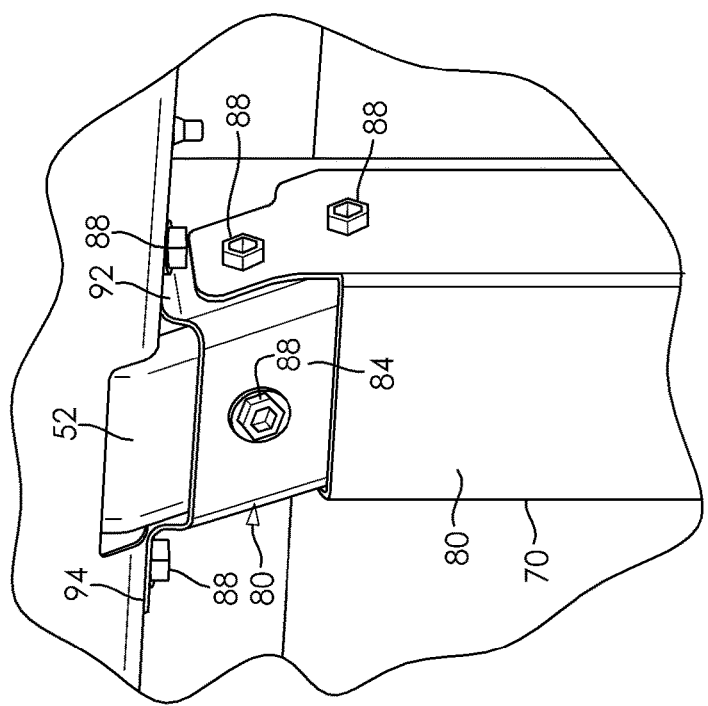
FIG. 9 depicts a perspective view of the upper attachment mechanism of the system of FIGS. 2-4.

In one example, shown in FIGS. 7 and 9, the upper attachment mechanism 80 may be integrally formed with an upright member 70. It is understood, however, that the upper attachment mechanism 80 may be a separate component if desired. The upper attachment mechanism 80 may include at least one side flange portion 82. The side flange portion 82 may be formed on an upper end of at least one of the side portions 76. The side flange portion 82 may extend coplanar with the side portion 76 such as in an upward direction.

It may be also that the upper attachment mechanism 80 may have at least one central flange portion 84, as shown in FIG. 7. The central flange portion 84 may be connected with the central portion 74. The central flange portion 84 may extend at an angle with respect to the plane of the central portion 74. The angle may be such as an upward acute angle from the central portion 74. In other embodiments, such as shown in FIG. 9, a central flange portion 84 is not utilized.

One or more of the flange portions 82, 84 may include at least one aperture 86 formed therein. As shown in FIG. 7, the apertures 86 may accommodate mechanical fasteners 88 that connect the upright members 70 with the ribs 52.

Returning to FIGS. 3 and 4, another embodiment of an upper attachment mechanism 80 is depicted. The upper attachment mechanism 80 may include an upper end portion 90 having at least one outwardly extending flange 92 and/or at least one opposing outwardly extending flange 94. In certain embodiments depicted in FIG. 5, the upper attachment mechanism 80 may be a separate component that is selectively adjustable along the upright member 70 in a vertical direction. It is also understood that the at least one outwardly extending flange 92 and/or the at least one outwardly extending flange 94 may be formed integrally with the upright member 70. Each of the flanges 92, 94 may include at least one aperture 86 formed therein. As shown in FIG. 5, the apertures 86 may accommodate mechanical fasteners 88 that connect the upright members 70 with at least one of the ceiling 46, the ribs 52, and/or other portions of the cargo area 30 of the vehicle 32.

Figure 6:
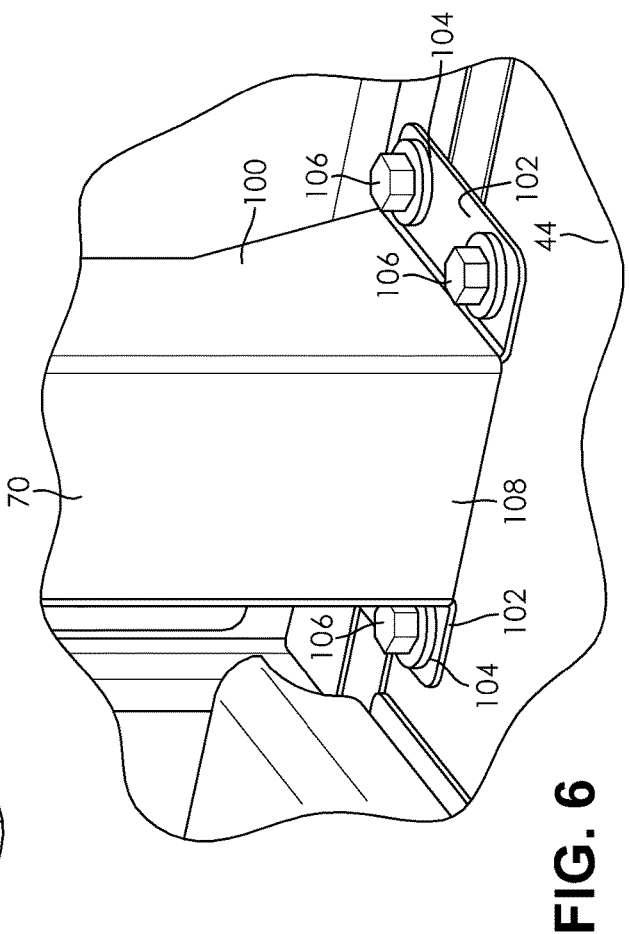
FIG. 6 depicts a perspective view of one embodiment of a lower attachment mechanism of the system of FIGS. 2-4.
Figure 10:
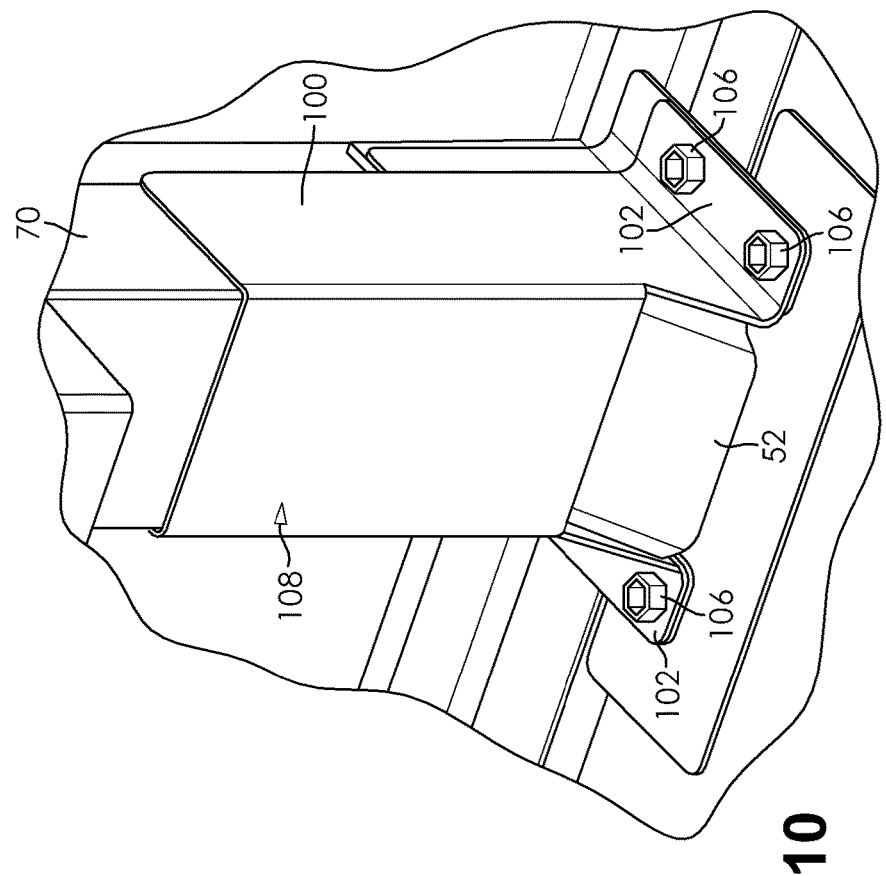
FIG. 10 depicts a perspective view of the lower attachment mechanism of the system of FIGS. 2-4.

Referring back to FIGS. 3 and 4, at least one of the upright members 70 may also include a lower attachment mechanism 100 having at least one outwardly extending flange 102. In the two embodiments of the lower attachment mechanism 100 depicted in FIGS. 6, 8 and 10, the lower attachment mechanism 100 may be a separate component that is selectively adjustable along the upright member 70 in a vertical direction. It is also understood that the at least one outwardly extending flange 102 may be formed integrally with the upright member 70 as shown in the embodiment of the lower attachment mechanism 100 depicted in FIGS. 6, 8 and 10. The flange 102 may include at least one aperture 104 formed therein. As shown in FIGS. 6, 8, and 10, the apertures 104 may accommodate mechanical fasteners 106 that connect the upright members 70 with of the floor 44, the ribs 52, and/or other portions of the cargo area 30 of the vehicle 32. The flange 102 may extend generally transverse the side portion 76 of the upright member 70. The flange 102 may extend generally parallel the floor 44.

In one embodiment, the lower attachment mechanism 100 may have at least a portion of which is complimentary in shape to at least a portion of the upright member 70. In such a case, the lower attachment mechanism 100 may have a generally U-shaped body portion 108 that extends about, such as in an overlapping manner, the upright member 70.

Additionally, at least one of the upright members 70 may include a plurality of apertures 110 formed in at least one of the side portions 76 and/or the central portion 74. The apertures 110 may accommodate mechanical fasteners (not depicted) that connect the upright members 70 with at least one of the ribs 52 and/or at least one of the rails 54.

In one example, an aperture 110 in the upright member 70 may be aligned with a preexisting aperture in a rib 52 and/or a rail 54. A fastener extending through the aperture 110 of the upright member 70 into the rib 52 and/or rail 54 secures the upright member 70 to the rib 52 and/or rail 54. By using preexisting apertures provided by the original equipment manufacturer, no additional apertures need to be located in the vehicle 32. This is advantageous as such additional apertures could undesirably and inadvertently damage other components of the vehicle 32 such as a battery, cabling, and/or electronics, for example. Further yet, in some embodiments, the at least one of the mechanical fasteners 88, 106 and those not depicted, may be mechanical fasteners provided by the original equipment manufacturer of the vehicle 32 and which are already located in the apertures of the ribs, 52, the rails 54 and/or the pillars 56. Thus, additional fasteners may not be required, which reduces the cost of the shelving units 68, as well as militates against wear, corrosion, and weakening of the sidewalls 34, 36, ceiling 46, and floor 44 of the of the vehicle 32 that may result from each additional aperture and mechanical fastener employed. Further yet, by using OEM approved fasteners, the fasteners are certain to fit and may keep the vehicle warranty in place.

In some cases, all of the upright members 70 associated with a side wall 34, 36, may be in a single plane (extending parallel with the longitudinal axis of the vehicle) generally parallel the respective side wall 34, 36. By securing the upright members 110 to the vehicle 22 in this manner, the upright members 110 are mounted in a single plane, which provides a compact system that does not significantly intrude into the cargo area 30.

One or more cross-pieces (not depicted) may connect the upright members 70 together. The cross-pieces may be part of the vehicle shelf system 66. The cross-pieces may extend at an angle, such as transverse, for example, or the primary direction of the upright members 70. In certain embodiments, the cross-pieces are co-planar with one another, however, the location of the cross-pieces may be anywhere along the vertical height of the upright members 70. Further, more than one cross-piece may be used to span between upright members 70. The cross-pieces may provide structural stability and rigidity to the system 66.

The shelving units 68 shown in FIGS. 3 and 4 may further include at least one shelf member 112 coupled to at least one of the upright members 70. Each of the upright members 70 may include a pair of vertically spaced apart under-shelf brackets 114. Greater or fewer of the under-shelf brackets 114 than shown may be employed. In some embodiments, each of the under-shelf brackets 114 of one of the upright members 70 may be longitudinally aligned with a corresponding one of the under-shelf brackets 114 of another one of the upright members 70. One of the shelf members 112 may be disposed across the under-shelf brackets 114 of the two spaced-apart upright members 70. It may also be possible that two shelf members 112 share a single under-shelf bracket 114.

FIG. 11 shows one of the under-shelf brackets 114 according to an embodiment of the subject matter. Each of the under-shelf brackets 114 may include a central portion 116 and opposing side portions 118, 120. The side portions 118, 120 may extend substantially parallel one another and transverse the central portion 116. The central portion 116 and the side portions 118, 120 may form a general U-shaped cross-section.

A spanner bracket 122 may be connected to an upright member. In one embodiment, the spanner bracket 122 may have first and second sides 124, 126 connected together with a cross-member 128. The cross-member 128 fixed the distance between the sides 124, 126. Each side 124, 126 of each spanner bracket 122 may have a first leg portion and a second leg portion 130, 132. The first leg portion 130 may be located adjacent the side portion 76 of the upright member 70. The first leg portion 130 may be connected to the side portion 76 through welding and/or mechanical fasteners.

The second leg portion 132 may be coplanar with the first leg portion 130 and extend therefrom such as in a cantilevered manner. The second leg portion 132 may be connected to the side portions 118, 120 of the under-shelf bracket 114. The connection may be such as through a pivot bar 134 that permits selective rotational movement of the undershelf bracket 114, and thus the shelf member 112, with respect to the fixed spanner bracket 122. The pivot bar 134 may extend through aligned apertures in the second leg portion 132 and one or more of the side portions 118, 120. The pivot bar 134 may remain generally stationary and it does not typically rotate, pivot or translate. A single pivot bar 134 may be employed at each under-shelf bracket 114 and spanner bracket 122 connection.

In some embodiments, the pivot bar 134 may be located within, or in contact with, one or more bushings (not depicted). Bushings may be used between the spanner bracket and the under-shelf bracket to reduce friction and facilitate selective movement between the two. The pivot bar 134 and/or the bushings permit movement of the under-shelf bracket in a single vertical plane, which is generally transverse the longitudinal axis 72 of the vehicle 32.

A spanner bracket 122 may be located on each upright member 70 where a shelf member 112 is to be attached. The spanner bracket 122 may transfer the load from the shelf member 112, which may have items thereon adding to the load, into the upright member 70. The upright member 70 is designed of a material and that material is provided with a sufficient thickness to withstand that loading. Thus, a shelfing unit 68 attached to upright member 70 such as described above may be provided with a load capacity that far exceeds the load the ribs 54 may take on their own.

In one embodiment shown in FIG. 4, the side portions 118, 120 of the under-shelf bracket 114 terminate before they reach a rear edge 136 of the shelf member 112. In such a case, a gap 138 is provided between the rear edge 136 of the shelf member 112 and the end of the side portions 118, 120. The gap 138 may provide space for the side portions 118, 120 when the shelf member 112 is in an in-use, lowered position; an upright member 70 may take up at least some of the gap 138. Accordingly, the pivot bar 134 may be located outwardly, such as transverse the longitudinal direction, when the shelf member 112 is in the lowered position, from the rear of the side portions 118, 120. As noted above, the spanner bracket second leg portions 132 extend forward from the upright member 70 to meet the ends of the side portions 118, 120. As a result, a pivot axis 140 of the shelf member 112 may be located outboard (in the transverse the longitudinal axis 72 direction when the shelf member 112 is lowered) on the side portions 118, 120 by a predefined distance 142.

The spanner bracket 122 may facilitate the location of the pivot axis 140 for the shelf member 112. In one embodiment, the second leg portion 132 of each spanner bracket 122 extends the pivot axis 140 away from the upright member 70 by a length of the second leg portion 132. By locating the pivot bar 134 through an aperture 144 in the second leg portion 132, which overlaps with an inboard end portion of the side portions 118, 120, the pivot bar 134 is extended to a location outboard on the side portions 118, 120 from the end of the side portions 118, 120.

As may be appreciated from FIG. 4, the central portion 116 of the under-shelf bracket 114 may be connected directly to the shelf member 112 such as with mechanical fasteners, for example. The connection may be such as locating the central portion 116 in direct facing contact with a lower surface 146 of the shelf member 112. It may also be possible to also form the undershelf bracket 114 directly with the shelf member 112 such that the two are unitary, integrally formed and one-piece.

FIGS. 3 and 4 depict the condition when the shelf member 112 may have an upper surface 148 that is substantially parallel the lower surface 146. The two surfaces 146, 148 may define a substantially constant thickness between them. In one embodiment, the shelf member 112 may have a generally rectangular shape. As can be appreciated, however, the shelf members 112 may be any suitable size, shape, and configuration as desired.

Edge portions 150 of each shelf member 112 may define the boundary of the upper and lower surfaces 146, 148. The edge portions 150 may be comprised of upstanding or down-standing lengths of material that may extend along at least a portion of a perimeter of the shelf member 112. In some embodiments, the edge portions 150 may be helpful in preventing materials located on the upper surface 148 from leaving the upper surface 148.

As noted above, the general shape of the shelf member 112 may be rectangular. However, as may be appreciated from FIG. 4, the rear edge 136 of the shelf member 112 may have some deviations from being entirely straight. For example, the rear edge 136 may have one or more upright member recesses 152, which may be part of the gap 138 or separate therefrom, in selected locations. Each upright member recess 152 may accommodate at least a portion of an adjacent upright member 70. The exemplary embodiments in the figures depict upright member recesses 152 in the rear edge 136 that extend at least the width of the adjacent upright member 70. The depth of each upright member recess 152 may accommodate at least a portion of the adjacent upright members 70 and/or a portion of the spanner bracket 122. The portion of the spanner bracket 122 may be such as the first leg portions 130, the second leg portions 132 and/or the cross member 128.

In one embodiment, the depth of each upright member recess 152 may accommodate at least a portion of the under-shelf bracket 114. As can be appreciated from the figures, when the shelf member 112 is located in the in-use, lowered position, at least a portion of the under-shelf bracket 114 can be accommodated within the upright member recess 152. This permits the rear edge 136 of the shelf member 112 to be located as close to the upright member 70 and the sidewalls 34, 36 of the vehicle 32 as possible. By being located close to the sidewalls 34, 36, the vehicle shelf system 66 intrudes less into the cargo area 30 in both a raised or stowed, second position, as well as the in-use, first, lowered position. Further, any gap that exists between the rear edge 136 and the sidewalls 34, 36 is minimized, which reduces the likelihood that items on the shelf member 112 can fall between the rear edge 136 thereof and the sidewalls 34, 36 of the vehicle 32.

As noted above, the upright member recesses 152 may also receive the cross-member 128 of each spanner bracket 122 when the shelf member 112 is in the in-use, lowered, first position. In these instances, an upper portion of the first leg portion 130 of the spanner bracket 122 may be received within the upright member recess 152. In that embodiment, the upper portions of each of the spanner brackets 122 may be flush with the upper surface 148 of the shelf member 112. By being flush with the upper surface 148 of the shelf member 112, the upper portions of each of the spanner brackets 122 function to prevent items placed on the shelf member 112 from falling into the upright member recesses 152. Preferably, the upright member recesses 152 may be wide enough that the spanner brackets 122 are received therein without contacting the edges of the shelf member 112 that define the upright member recesses 152.

In the embodiments depicted in FIGS. 3 and 4, the shelf member 150 may extend at an angle from the upright members 110 when the shelf member 150 is in the in-use, first position. The angle created between the upper surface 151 of the shelf member 150 and the upright members 110 may be between 75-120 degrees. In a preferred embodiment, the angle between the upper surface 151 of the shelf member 150 and the upright members 110 may be less than 90 degrees so as to reduce the possibility that items located on the upper surface 151 of the shelf member 150 do not fall off the shelf member 150. Instead, the items may become captured between the shelf member 150, the upright members 110, and a respective one of the sidewalls 24, 26.

As can be appreciated from the above, in one embodiment the shelf member 112 is cantilevered from the upright members 70. Preferably, besides the structures mentioned above, the shelf member 112 is not further structurally supported on the upright members 70, the sidewalls 34, 36, the ceiling 46, or the floor 44. Thus, there are no additional structural support structures that attach to the upper or lower surfaces 146, 148 of the shelf member 112, and none that attach to the under-shelf brackets 114. Further, to reduce complexity and costs, no structures, except for the shelf member 112 itself, extend between the under-shelf brackets 114.

FIGS. 12-23 show another embodiment of a vehicle shelf system 66' for a cargo area 30' of a vehicle 32' similar to that shown in FIGS. 1-11. More particularly, the vehicle shelf system 66' may include a lower attachment mechanism 100', an upper attachment mechanism 80', and a biasing member 154. Reference numerals for similar structures in respect of the description of FIGS. 1-11 are repeated in FIGS. 12-23 with a prime (') symbol.

Figure 22:
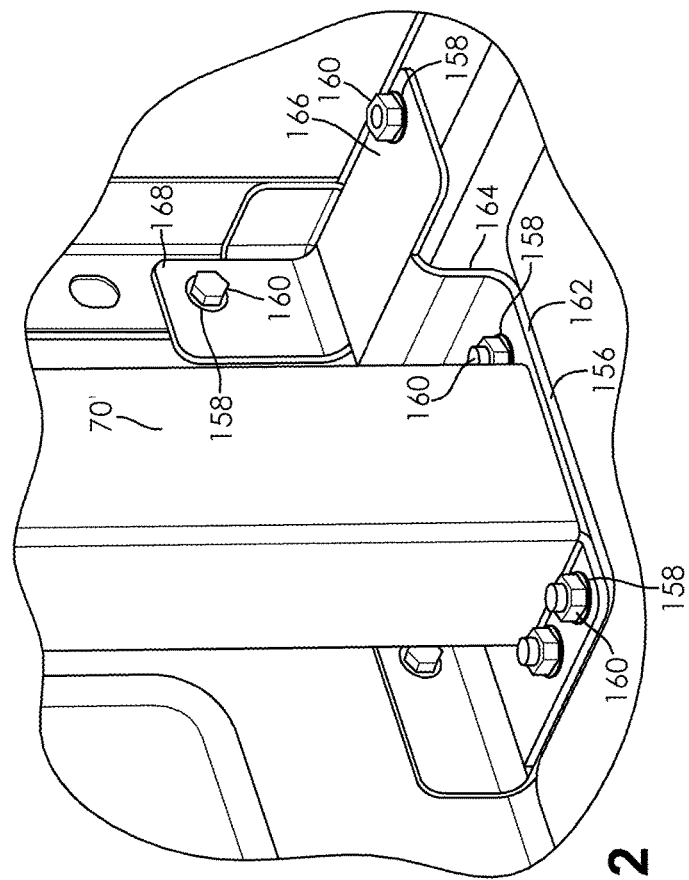
FIG. 22 depicts a perspective view of another lower attachment mechanism of the system of FIGS. 12-20.
Figure 21:
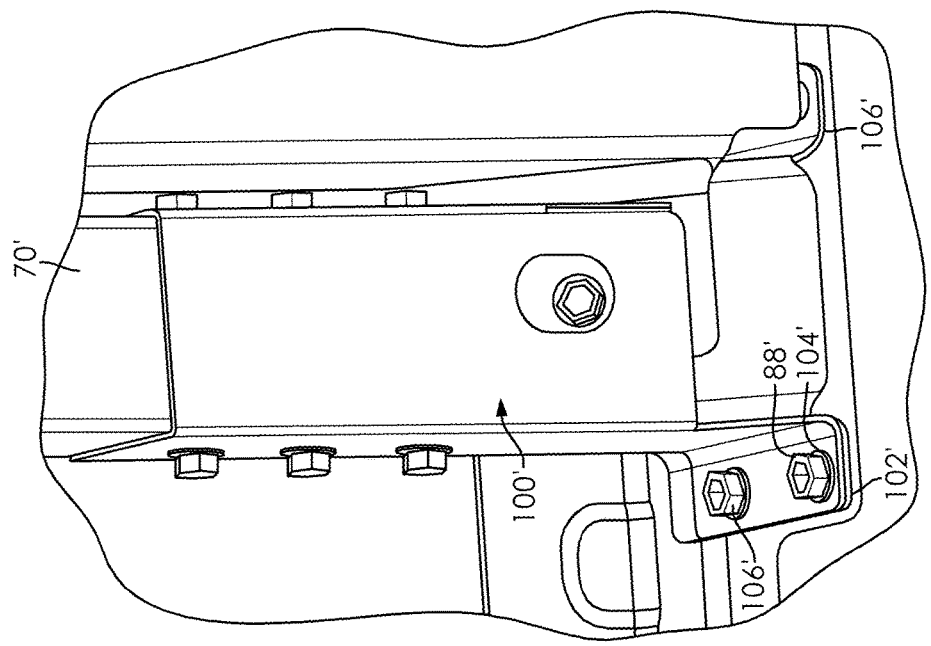
FIG. 21 depicts a perspective view of a lower attachment mechanism of the system of FIGS. 12-20.

As best seen in FIGS. 21 and 22, the lower attachment mechanism 100' may include a lower end portion having at least one outwardly extending flange 102'. Some embodiments of the lower attachment mechanism 100' may also have a coupler 156 as shown in FIG. 22. The flange 102' and/or the coupler 156 may be configured to correspond with features and contours formed in the cargo area 30' of the vehicle 32'.

As depicted in FIG. 21, the lower attachment mechanism 100' may be a separate component that is selectively adjustable along the upright member 70' in a vertical direction. It is also understood that the at least one outwardly extending flange 102' and/or the coupler 156 may be formed integrally with the upright member 70'. The flange 102' and/or the coupler 156 may each include at least one aperture 104', 158 formed therein. As shown in FIGS. 21 and 22, the apertures 104', 158 may accommodate mechanical fasteners 88', 160 that connect the upright members 70' with at least one of the floor 44', the rails 54', and other portions of the cargo area 30' of the vehicle 32'.

In a preferred embodiment shown in FIG. 22, the lower attachment mechanism 100' may be secured to the floor 44' by mechanical fasteners 88' disposed through existing apertures formed in the floor 44' so no additional drilling through the floor 44' is needed. Such mechanical fasteners 88' are also employed to secure the upright member 70' to the lower attachment mechanism 100'

The coupler 156 may be integrally formed with the lower attachment mechanism 100' or separately formed but attached thereto. The coupler 156 may have a lower flange 162, a transition portion 164, and first and second upper flanges 166, 168.

The lower and first upper flanges 162, 166 may be connected together by the transition portion 164, which may be curvilinear. The lower and first upper flanges 162, 166 may be parallel one another but not coplanar with one another as a result of the transition portion 164.

The second upper flange 168 may extend generally transverse the first upper flange 166. In some cases, the second upper flange 168 may extend from a rear portion of the first upper flange 166.

Fastener apertures 158 may be located in both the first and second upper flanges 166, 168 and corresponding fasteners 160 may be located through the apertures 158 and into pre-existing apertures in the vehicle 32' to secure the flanges 166, 168 and thus the lower attachment mechanism 100' to the vehicle 32'.

Figure 23:
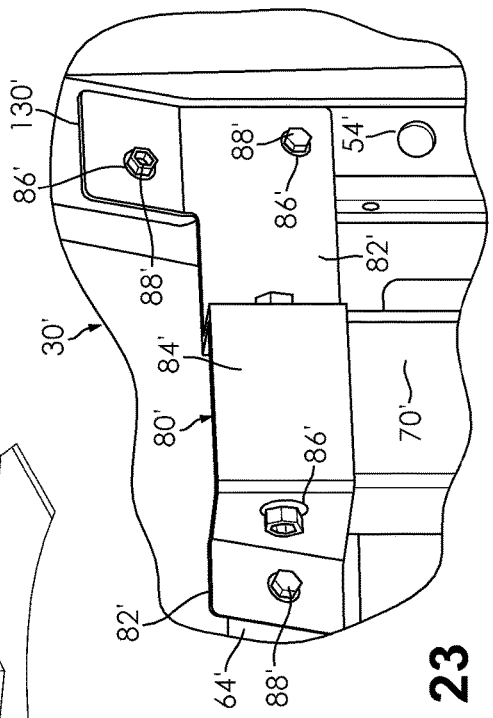
FIG. 23 depicts a perspective view of an upper attachment mechanism of the system of FIGS. 12-20.

As best seen in FIG. 23, the upper attachment mechanism 80' may be a separate component that is selectively adjustable along the upright member 70' in a vertical direction. It is understood, however, the upper attachment mechanism 80' may be integrally formed with the upright member 70' if desired. The upper attachment mechanism 70' may include an upper end portion having at least one outwardly extending flange 82' and/or at least one opposing outwardly extending flange 82'. It is also understood that the at least one outwardly extending flange 82' and/or the at least one outwardly extending flange 82' may be formed integrally with the upright member 70'. Each of the flanges 82' may include at least one aperture 86' formed therein. The apertures 86' may accommodate mechanical fasteners 88' that connect the upright members 70' with at least one of the ceiling rail 64', the rails 54', and other portions of the cargo area 30' of the vehicle 32'.

In certain embodiments, a biasing member 154 may be employed with the shelving units 68'. A first end portion 170 of the biasing member 154 may be attached to the side portion 76' of the upright member 70'. In another embodiment, as shown in FIGS. 17-20, such a connection may be a ball stud 172 that may be directly attached to the central portion 74' without any intervening structure. More preferably, a stud portion 174 of the ball stud 172 is located in the aperture 86' formed in the central portion 74' and/or side portions 76' of the upright members 70'.

The biasing member 154 may be comprised of a socket 176 that receives the ball stud 172 therein. The ball stud 172 and socket 176 design permits the socket 176, and thus the biasing member 154, to rotate with respect to the ball stud 172, which is advantageous for aligning the two during installation and permitting relative movement between the two during operation. In some embodiments, the biasing member 154 may be such as a pneumatic piston or other fluid driven device.

Preferably, the connection between the ball stud 172 and the socket 176 may be the only connection between the first end portion 170 of the biasing member 154 and the upright member 70'. As noted above, the ball stud 172 and the socket 176 may permit relative rotation, but there is no axial translation (along the longitudinal axis 72) via this connection. The lack of axial translation at the connection is an advantage that reduces complexity, and thus cost, and it eliminates failure modes, as well as pinch points. The socket 176 may be connected to a piston housing 178 having a piston rod 180 slidably disposed therein.

A second end 182 of the biasing member 154 may comprise a socket 184 that receives a ball stud 186 disposed on an end of the piston rod 180. As shown more clearly in FIG. 20, the ball stud 186 may be directly attached to the under-shelf bracket 144' without any intervening structure. More preferably, a stud portion 188 of the ball stud 186 is located in an aperture formed in at least one of the side portions 118', 120' of the under-shelf bracket 144'. The ball stud 186 and socket 184 design permits the socket 184, and thus the biasing member 154, to rotate with respect to the ball stud 186, which is advantageous for aligning the two during installation and permitting relative movement between the two during operation. Preferably, the connection between the ball stud 186 and the socket 184 may be the only connection between the second end portion 182 of the biasing member 154 and the under-shelf bracket 144'. The lack of axial translation at the connections is an advantage that reduces complexity and thus cost, eliminates failure modes, as well as pinch points, and maintains the shelf member 112' in close proximity to the upright member 70' which reduces its operational profile. In some embodiments, the biasing member 154 may be substantially parallel to the upright member 70', such as the one of the side portions 76', when the shelf member 112" is the in-use, first, or lowered, position.

A length of the biasing member 154 may change as the shelf member 112' moves from the raised or stowed, second position to the lowered, in-use, first position. Simultaneously, as the length of the biasing member 154 changes, an angle of the biasing member 154 with respect to the stationary upright member 70' when pivoting the shelf member 112' between the raised or stowed, second position and the lowered, in-use, second position changes. In some cases, an acute angle may form between the biasing member 154 and the side portions 76' when the shelf member 112' is located in the lowered, in-use, first position.

The shelf system 66' may employ more or less of the biasing members 154 than shown. In some embodiments, only a single biasing member 154 connects a single upright member 70' with a shelf member 112'. The vehicle shelf system 66' advantageously does not require additional springs, pistons, motors or other movement devices to enable a user to raise or lower the shelf member 112'. This reduces complexity, weight, pinch points and cost in the vehicle shelf system 66' compared to the prior art.

In some embodiments, a cover (not depicted) may be located at least partially over each biasing member 154. The biasing member 154 may not connect with the cover and the cover may serve no function to the biasing member 154 in terms of support to, or connection with, the upright member 70'. Instead, the cover is designed to keep items in the vehicle 32' and items, such as the operator and the operator's clothing, from becoming entangled with the biasing member 154, or any of the associated connections therewith.

Figure 24:
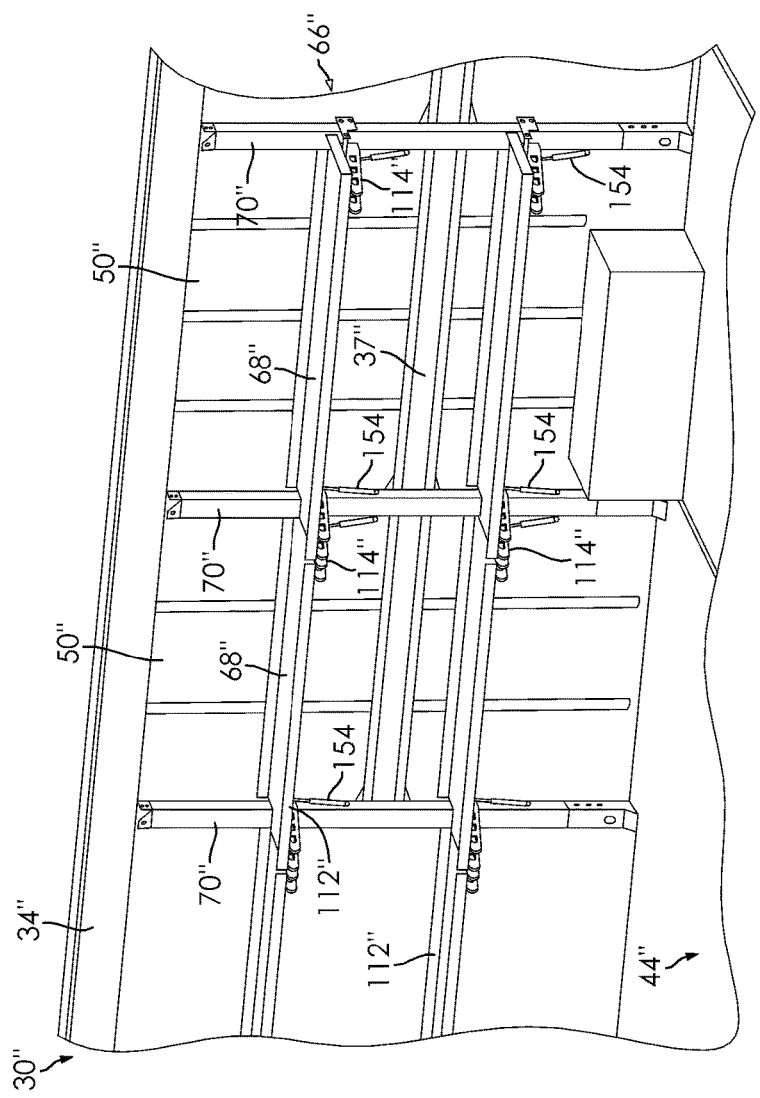
FIG. 24 depicts a side perspective view of a partial cut away showing the interior of the vehicle of FIG. 1 including a system according to another embodiment of the presently disclosed subject matter.
Figure 25:
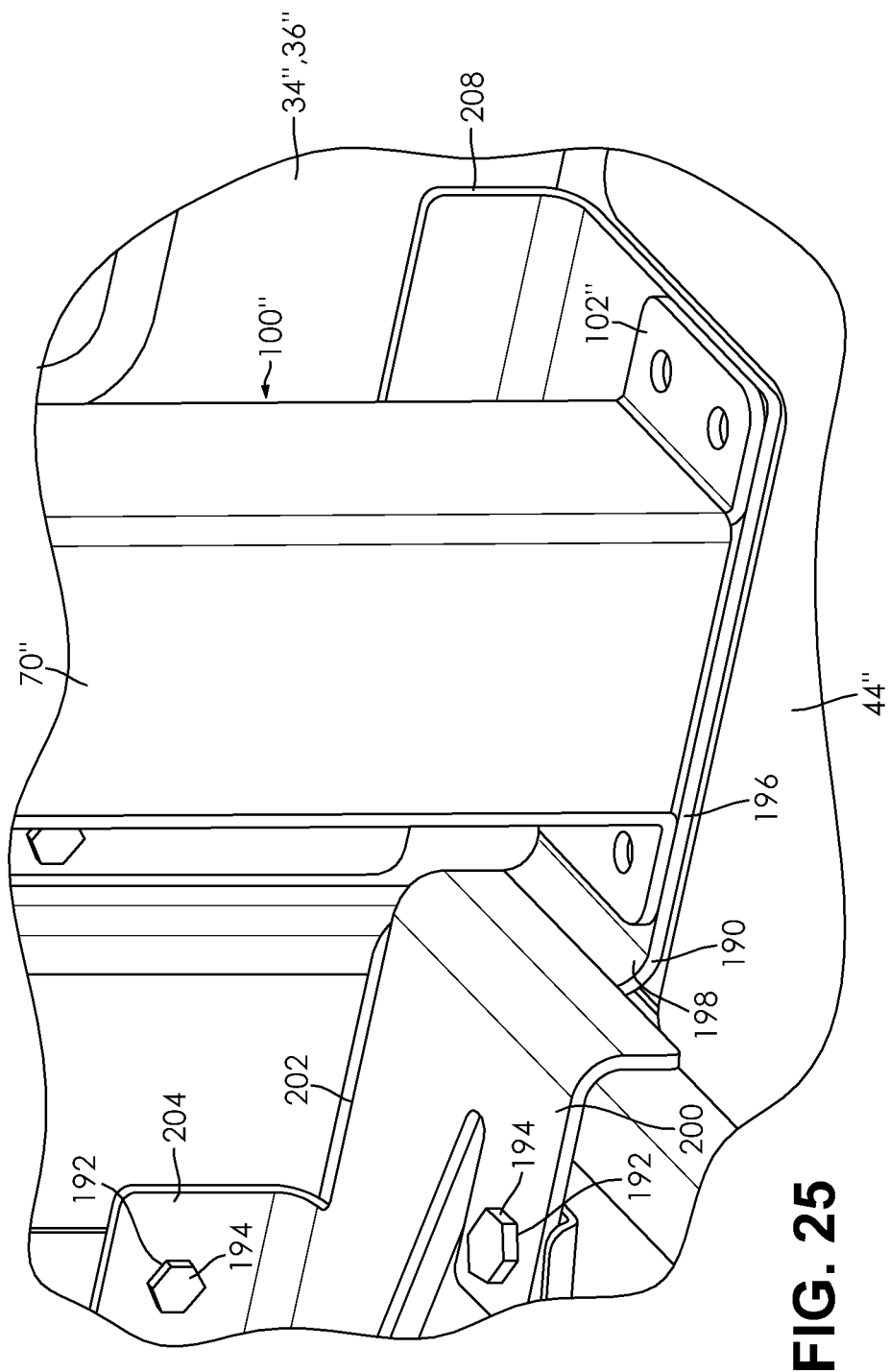
FIG. 25 depicts a perspective view of a lower attachment mechanism of the system of FIG. 24.

FIGS. 24-25 show another embodiment of a vehicle shelf system 66" for a cargo area 30" of a vehicle 32" similar to that shown in FIGS. 1-23. More particularly, the vehicle shelf system 66" may include a lower attachment mechanism 100" according to another embodiment. Reference numerals for similar structure in respect of the description of FIGS. 1-23 are repeated in FIGS. 24-25 with a prime (") symbol.

As best seen in FIG. 25, the lower attachment mechanism 100" may include a lower end portion having a coupler 190.

The lower attachment mechanism 100" may be a separate component that is selectively adjustable along the upright member 70" in a vertical direction. It is also understood that at least one coupler 190 may be formed integrally with the upright member 70". The coupler 190 may each include at least one aperture 192 formed therein. As shown in FIG. 25, the apertures 192 may accommodate mechanical fasteners 194 that connect the upright members 70" with at least one of the floor 44", the rails 54", and other portions of the cargo area 30" of the vehicle 32".

In one embodiment shown in FIG. 25, the coupler 190 may be secured to the floor 44" by mechanical fasteners 194 disposed through existing apertures formed in the floor 44" so no additional drilling through the floor 44" is needed. Such mechanical fasteners 194 may also be employed to secure the upright member 70" to the lower attachment mechanism 100".

The coupler 190 may be integrally formed with the coupler 190 or separately formed but attached thereto. The coupler 190 may have a lower flange 196, a transition portion 198, first and second upper flanges 200, 202 and a transverse flange 204.

The lower flange 196 and first and second upper flanges 200, 202 may be connected together by the transition portion 198, which may be curvilinear. The lower and first and second upper flanges 200, 202 may be parallel one another but not coplanar with one another as a result of the transition portion 198. The first and second upper flanges 200, 202 may have a U or V-shaped groove separating them. The transverse flange 204 may extend generally transverse the second upper flange 200.

Fastener apertures 192 may be located in the first upper flange 200 and the transverse flange 204 and corresponding fasteners 194 may be located through the apertures 206 and into pre-existing apertures in the vehicle 32" to secure the flanges 200, 204 and thus the coupler 190 to the vehicle 32".

The coupler 190 may also have a side wall flange 208. The side wall flange 208 may extend generally parallel, but not co-planar with, the transverse flange 204. The side wall flange 208 may abut a side wall 34" or 36" of the vehicle 32".

More than one shelf system 36, 36', 36" may be installed in a vehicle 22, 22', 22". Each of these shelf systems 36, 36' and 36" may be as described above but they may each be of different dimensions and shapes.

In accordance with the provisions of the patent statutes, the device has been described in what is considered to represent its preferred embodiments. However, it should be noted that the device can be practiced otherwise than as specifically illustrated and described without departing from its spirit or scope.

What is claimed is:

1. A wall reinforcement and shelf system for a vehicle cargo area, comprising:
   at least one rib, the rib having at least one fastener aperture;
   a reinforcing member connected to the at least one rib, wherein the rib and the reinforcing member have substantially similar overall lengths;
   at least one bracket having a first end portion attached to the reinforcing member and a second end portion extending substantially transverse the reinforcing member wherein the second end portion has a first pivot aperture;
   a shelf support member having an upper portion and at least one side portion extending substantially transverse the upper portion, wherein the at least one side portion has a second pivot aperture aligned with the first pivot aperture;
   a pivot bar extending through the first and second pivot apertures, wherein the shelf support member selectively pivots about the pivot bar;
   a shelf member attached to the upper portion of the shelf support member;
   a biasing member having a first end connected to the reinforcing member and a second end connected to the at least one side portion of the shelf support member.

2. The system of claim 1, wherein the rib substantially continuously extends from a floor of the cargo area to a roof of the cargo area.

3. The system of claim 1, wherein the rib is attached to a wall of the cargo area, the rib comprising two sides walls directly connected a front wall extending between the two side walls.

4. The system of claim 3, wherein the reinforcing member has two side walls connected together by a front wall, wherein the side walls and the front wall define a C-shaped cross section, wherein the reinforcing member front wall extends parallel the front wall of the rib.

5. The system of claim 4, wherein the reinforcing member front wall extends substantially continuously along the rib front wall, and wherein the reinforcing member side walls extend substantially parallel and continuously along the rib side walls.

6. The system of claim 5, wherein the reinforcing member front wall and side walls substantially encase the rib front wall and side walls.

7. The system of claim 1, wherein the reinforcing member has a lower attachment portion, wherein said lower attachment portion has at least one flange with a portion extending parallel the floor, wherein the portion has a fastener aperture aligned with a fastener aperture in the floor.

8. The system of claim 3, wherein the reinforcing member has an upper attachment mechanism, wherein the upper attachment mechanism has at least one flange portion extending parallel one of the rib side walls, wherein the at least one flange has a fastener aperture aligned with one of the at least one fastener apertures in the rib side wall.

9. The system of claim 1, wherein the at least one bracket has a first side and a second side each located on a respective side of the reinforcing member, and wherein the two sides are parallel and co-planar with one another, the at least one bracket having a cross-member having a substantially constant thickness between the sides.

10. The system of claim 9, wherein the shelf support member has two side portions that extend parallel one another separated by the upper portion, wherein the second end portions of the at least one bracket extends parallel the two side portions.

11. The system of claim 10, wherein the two side portions of the shelf support member each have second pivot apertures, wherein the second pivot apertures are aligned with the first pivot aperture of the at least one bracket and a pivot pin extends through each of the apertures.

12. The system of claim 1, wherein the biasing member is connected to the shelf support member below the pivot bar.

13. A wall reinforcement and shelf system for a vehicle cargo area, comprising:
   a vehicle side wall having at least one vertically extending rib;
   a reinforcing member having a header portion and a footer portion, wherein at least a portion of said header portion or said footer portion has a complementary shape to the reinforcing member, wherein one of said header portion or said footer portion is selectively adjustable along a height of the reinforcing member wherein the reinforcing member at least partially encases the rib;

at least one bracket having a first end portion attached to a side wall of the reinforcing member and a second end portion with a first pivot aperture;

a shelf support member having a second pivot aperture aligned with the first pivot aperture, a pivot bar extending through the first and second pivot apertures, the pivot bar extending parallel a front wall of the reinforcing member, wherein the shelf support member selectively pivots about the pivot bar; and a shelf member attached to the shelf support member.

14. The system of claim 13, further comprising a biasing member having a first end connected to the reinforcing member and a second end connected to the shelf support member under the shelf member.

15. A wall reinforcement and shelf system for a vehicle cargo area, comprising:

a first rib reinforcing member and a second rib reinforcing member, wherein both reinforcing members each have two side walls connected together by a front wall to form a hollow channel;

wherein the hollow channel is adapted to selectively receive a vehicle side wall rib therein, wherein the hollow channel is adapted to receive the vehicle side wall rib substantially along a majority of a length of the reinforcing member; and a shelf member pivotally connected to each of the first and second rib reinforcing members.

16. The system of claim 15, wherein at least one of the reinforcing members has a cross-section having only the front wall bounded by the two side walls wherein the two side walls extend substantially transverse the front wall.

17. The system of claim 16, further comprising a lower attachment portion having at least a partially complimentary shape to said at least one reinforcing member, wherein said lower attachment portion is selectively adjustable along a length of the at least one reinforcing member.

18. The system of claim 16, further comprising an upper attachment portion having at least a partially complimentary shape to said at least one reinforcing member, wherein said upper attachment portion is selectively adjustable along a length of the at least one reinforcing member.

19. The system of claim 15, wherein a spanner bracket connects one of said first and second rib reinforcing members to the shelf member, wherein said spanner bracket has first portions attached to the reinforcing member, second portions extending transverse the reinforcing member, and a cross member extending transverse the first and second portions, wherein the cross member is substantially coplanar with an upper surface of the shelf member.

20. The system of claim 19, wherein the cross member is selectively located in a recess of the upper surface of the shelf member.

21. The system of claim 15, wherein at least one of the rib reinforcing members is adapted to extend from adjacent a ceiling portion of the vehicle cargo area to a floor portion of the vehicle cargo area.

22. A wall reinforcement system adapted for use with a vehicle shelf system, comprising:

a rib reinforcing member adapted to reinforce a rib in a vehicle cargo area side wall, wherein said rib reinforcing member defines a hollow channel adapted to selectively receive the rib substantially along a majority of a length of the rib reinforcing member;

wherein at least one of a header portion for the rib reinforcing member and a footer portion for the rib reinforcing member has a complementary shape to the reinforcing member, wherein one of said header portion or said footer portion is selectively adjustable along a height of the rib reinforcing member; and a shelf attached to the rib reinforcing member.

23. The system of claim 22, wherein the header portion is adapted to connect the rib reinforcing member to a ceiling or a ceiling support and the footer portion is adapted to connect the rib reinforcing member to a floor or floor support.

* * * * *